(12) United States Patent
Miyahara et al.

(10) Patent No.: US 11,892,994 B2
(45) Date of Patent: Feb. 6, 2024

(54) INFORMATION MANAGEMENT METHOD, INFORMATION MANAGEMENT PROGRAM, AND INFORMATION MANAGEMENT DEVICE

(71) Applicant: NIPPON TELEGRAPH AND TELEPHONE CORPORATION, Tokyo (JP)

(72) Inventors: Kazuhiro Miyahara, Musashino (JP); Atsushi Isomura, Musashino (JP); Ichibe Naito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/911,144

(22) PCT Filed: Mar. 19, 2020

(86) PCT No.: PCT/JP2020/012540
§ 371 (c)(1),
(2) Date: Sep. 13, 2022

(87) PCT Pub. No.: WO2021/186737
PCT Pub. Date: Sep. 23, 2021

(65) Prior Publication Data
US 2023/0114514 A1    Apr. 13, 2023

(51) Int. Cl.
*G06F 16/22* (2019.01)
*G06F 16/2455* (2019.01)

(52) U.S. Cl.
CPC ...... *G06F 16/2228* (2019.01); *G06F 16/2455* (2019.01)

(58) Field of Classification Search
CPC .......................... G06F 16/2228; G06F 16/2455
See application file for complete search history.

(56) References Cited

U.S. PATENT DOCUMENTS

| 2010/0131550 | A1* | 5/2010 | Nakadai | H04L 45/00 707/769 |
| 2013/0339371 | A1* | 12/2013 | Hayashi | G06F 16/2458 707/743 |

(Continued)

FOREIGN PATENT DOCUMENTS

JP    2020-13539 A    1/2020

*Primary Examiner* — Mariela Reyes
*Assistant Examiner* — Courtney Harmon
(74) *Attorney, Agent, or Firm* — XSENSUS LLP

(57) ABSTRACT

An information management method executed by an information management apparatus that manages a space-time database which uses, as a key, a forward bit string of a bit string converted from space-time data including time data and positional data and which stores, as a value, corresponding data that corresponds to the space-time data, includes converting a range criterion of space-time data being a search object into a bit string, converting, when an index pattern of a first index that corresponds to a forward bit string of a bit string converted and an index pattern of a second index that corresponds to the key stored in the space-time database differ from each other, the first index into a third index of a same index pattern as the index pattern of the second index, and searching for the key using the third index and outputting, as a search result, corresponding data.

5 Claims, 30 Drawing Sheets

(56) References Cited

U.S. PATENT DOCUMENTS

2015/0356147 A1* 12/2015 Mishra ............... G06F 16/2365
707/693
2021/0109925 A1 4/2021 Isomura et al.

* cited by examiner

Fig. 2

| TIME POINT | LONGITUDE | LATITUDE | DATA PORTION |
|---|---|---|---|
| 2017/1/1 10:15:30 | 27.1984° | −15.2958° | DATA 1 |

| KEY | VALUE ⌐L2 | |
|---|---|---|
| | SECONDARY INDEX PORTION | DATA PORTION |
| FORWARD BIT STRING 1 (INDEX A-1) | REARWARD BIT STRING 1 | DATA 1 |
| | REARWARD BIT STRING 2 | DATA 2 |
| | ... | ... |
| FORWARD BIT STRING 2 (INDEX A-2) | ... | ... |
| ... | ... | ... |
| ... | ... | ... |
| ... | ... | ... |

Fig. 4

|  | TIME POINT RANGE | LONGITUDE RANGE | LATITUDE RANGE |
|---|---|---|---|
| BEGINNING | 2017/1/1 09:00:00 | 27° | −16° |
| TERMINATION | 2017/1/1 09:15:00 | 28° | −15° |

L3 ured bit string as a plurality of values (refer to Patent
INFORMATION MANAGEMENT METHOD, INFORMATION MANAGEMENT PROGRAM, AND INFORMATION MANAGEMENT DEVICE

CROSS-REFERENCE TO RELATED APPLICATION

The present application is based on PCT filing PCT/JP2020/012540, filed Mar. 19, 2020, the entire contents of which are incorporated herein by reference.

TECHNICAL FIELD

The present invention relates to an information management method, an information management program, and an information management apparatus.

BACKGROUND ART

With the arrival of the age of IoT (Internet of Things), data acquired by IoT devices are starting to be used in a wide variety of ways via networks. When these IoT devices are mobile devices such as a vehicle, a drone, or a smartphone, since actually acquired data is associated with time data and positional data (space-time data), an amount of data ends up being enormous.

Conventionally, a relational database management system (RDBMS) has been proposed which manages accumulated data in a table format to enable an enormous amount of data to be accumulated in an appropriate manner and to enable searches to be performed from the data using space-time data as a key. In addition, as a technique for handing space-time data, a technique has been proposed which involves converting space-time data into a one-dimensional bit string, adopting a forward bit string of the converted bit string as a key, and constructing a secondary index for storing a rearward bit string in a single key and data of the converted bit string as a plurality of values (refer to Patent Literature 1).

CITATION LIST

Patent Literature

[Patent Literature 1] Japanese Laid-open Patent Publication No. 2020-013539

SUMMARY OF THE INVENTION

Technical Problem

With the technique described in Patent Literature 1, a pattern of an index (an index pattern) is fixed. Therefore, with the technique described in Patent Literature 1, space-time data cannot be searched unless a search is performed using a criterion that matches an index pattern. For example, in the technique described in Patent Literature 1, when an index pattern is set in accordance with a criterion of 150 m/30 sec and a user requests a search using a criterion of 600 m/30 sec, space-time data cannot be searched since a different index pattern is applied. In this manner, the technique described in Patent Literature 1 is incapable of flexibly accommodating a search range desired by a user.

FIGS. 29 and 30 are diagrams illustrating related art. As shown in FIGS. 29 and 30, a method is conceivable in which data is stored in a multiplexed manner using a space-time index of respective patterns (for example, index patterns A, B, and C) in order to make a plurality of types of index patterns usable at the same time (refer to (1) in FIG. 30). In this method, during a search, space-time data can be searched by simply executing a single search with a single pattern of an index to be used for the search. However, when storing data in a multiplexed manner with respect to each of all patterns, a capacity of data to be accumulated in a database increases.

The present invention has been made in consideration of the above and an object thereof is to provide an information management method, an information management program, and an information management apparatus capable of flexibly accommodating a search pattern of a plurality of space-time indexes while reducing an amount of accumulated data in a data search including space-time data.

Means for Solving the Problem

In order to solve the problem and achieve the object described above, an information management method is an information management method executed by an information management apparatus that manages a space-time database which uses, as a key, a forward bit string of a bit string converted from space-time data including time data and positional data and which stores, as a value, corresponding data that corresponds to the space-time data, the information management method including: a converting a range criterion of space-time data being a search object into a bit string; converting, when an index pattern of a first index that corresponds to a forward bit string of a bit string converted and an index pattern of a second index that corresponds to the key stored in the space-time database differ from each other, the first index into a third index of a same index pattern as the index pattern of the second index; and searching for the key using the third index and outputting, as a search result, corresponding data included in a value of the searched key.

In addition, a non-transitory computer-readable recording medium stores therein an information management program that causes a computer to execute a process including: converting a range criterion of space-time data being a search object into a bit string with respect to a space-time database which uses, as a key, a forward bit string of a bit string converted from space-time data including time data and positional data and which stores, as a value, corresponding data that corresponds to the space-time data; of converting, when an index pattern of a first index that corresponds to a forward bit string of a bit string converted and an index pattern of a second index that corresponds to the key stored in the space-time database differ from each other, the first index into a third index of a same index pattern as the index pattern of the second index; and searching for the key using the third index and outputting, as a search result, corresponding data included in a value of the searched key.

In addition, an information management apparatus is an information management apparatus that manages a space-time database which uses, as a key, a forward bit string of a bit string converted from space-time data including time data and positional data and which stores, as a value, corresponding data that corresponds to the space-time data, the information management apparatus including: processing circuitry configured to: convert a range criterion of space-time data being a search object into a bit string; convert, when an index pattern of a first index that corresponds to a forward bit string of a bit string converted and an index pattern of a second index that corresponds to the key stored in the space-time database differ from each other, the first index into a third index of a same index pattern as the index pattern of the second index; and search for the key using the third index and output, as a search result, corresponding data included in a value of the searched key.

Effects of the Invention

According to the present invention, a search pattern of a plurality of space-time indexes can be flexibly accommodated while reducing an amount of accumulated data in a data search including space-time data.

BRIEF DESCRIPTION OF DRAWINGS

FIG. 2 is a diagram showing an example of a data configuration of acquired data to be transmitted by a data transmission device shown in FIG. 1.

FIG. 3 is a diagram showing an example of a data configuration of data to be stored by a space-time database (DB) shown in FIG. 1.

FIG. 4 is a diagram showing an example of a data configuration of a search request to be transmitted by a terminal apparatus shown in FIG. 1.

DESCRIPTION OF EMBODIMENTS

Hereinafter, embodiments of the present invention will be described in detail with reference to the drawings. However, it is to be understood that the present invention is not limited to the embodiments described below. It is also to be understood that, in the description of the drawings, a same portion is described by attaching a same reference sign thereto.

First Embodiment

Figure 1:
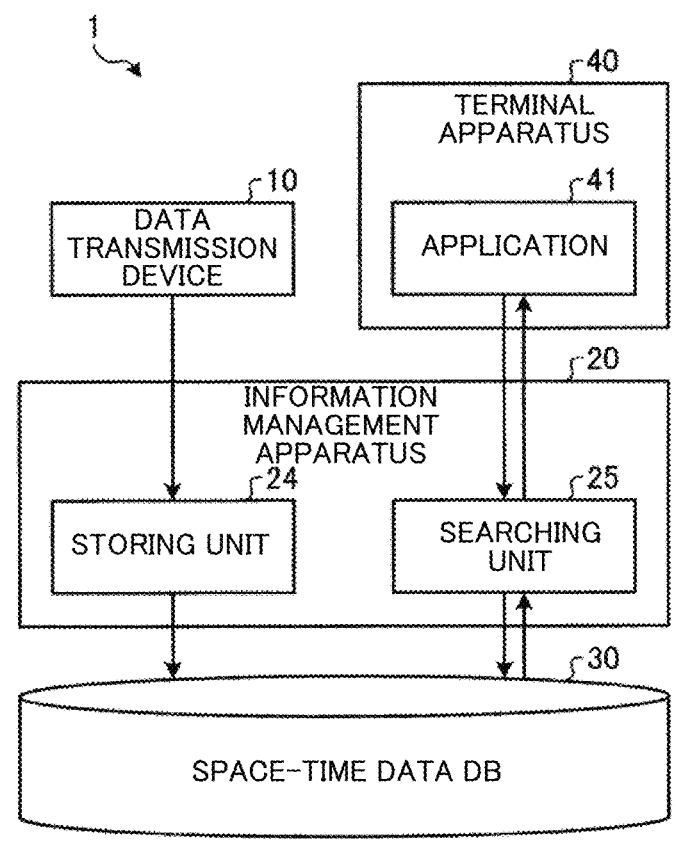
FIG. 1 is a diagram showing an example of a configuration of an information management system according to a first embodiment.

A first embodiment of the present invention will be described below. FIG. 1 is a diagram showing an example of a configuration of an information management system according to a first embodiment.

As shown in FIG. 1, an information management system 1 according to the first embodiment has a data transmission device 10, an information management apparatus 20, a space-time data DB 30, and a terminal apparatus 40. The information management apparatus 20 is connected to the data transmission device 10, the space-time data DB 30, and the terminal apparatus 40 by a network or the like.

The data transmission device 10 is an IoT device. For example, the data transmission device 10 is a mobile device such as a vehicle, a drone, or a smartphone. The data transmission device 10 transmits data acquired while traveling to the information management apparatus 20. The data transmission device 10 transmits, to the information management apparatus 20, acquired data in which space-time data including time data and positional data and corresponding data that corresponds to the space-time data are associated with each other. There may be one or a plurality of data transmission devices 10.

FIG. 2 is a diagram showing an example of a data configuration of acquired data to be transmitted by the data transmission device 10 shown in FIG. 1. As shown in a list L1 in FIG. 2, acquired data by the data transmission device 10 has a configuration in which various pieces of data (a data portion) acquired by the data transmission device 10 are associated with time data indicating a data acquisition time point and positional data indicating a longitude and a latitude. For example, the data transmission device 10 transmits "data 1" acquired at a time point "2017/1/1 10:15:30" at a position of which a longitude is "27.1984°" and a latitude is "−15.2958°" to the information management apparatus 20 in association with time data and positional data.

Returning to FIG. 1, an outline of the information management apparatus 20 will be described. The information management apparatus 20 manages acquired data transmitted by the data transmission device 10 by storing the acquired data in the space-time data DB 30. In addition, the information management apparatus 20 outputs as a search result, from data stored in the space-time data DB 30, corresponding data that corresponds to a range criterion of space-time data that is a search object. As substantial units, the information management apparatus 20 has a storing unit 24 and a searching unit 25. It should be noted that the information management apparatus 20 may be configured to be built into the data transmission device 10 or into an application 41.

The storing unit 24 stores acquired data in the space-time data DB 30. The storing unit 24 converts space-time data among information that is a storage object into a one-dimensional bit string and divides the converted one-dimensional bit string into a forward bit string and a rearward bit string. In addition, the storing unit 24 causes the space-time data DB 30 to store the divided forward bit string in a key and to store the divided rearward bit string and corresponding data in a value of the key.

The searching unit 25 outputs corresponding data that corresponds to a range criterion of the space-time data that is a search object as a search result. The searching unit 25 converts the range criterion of the space-time data that is a search object into a one-dimensional bit string and divides the converted one-dimensional bit string into a forward bit string and a rearward bit string. When an index pattern of a first index that corresponds to the forward bit string and an index pattern of a second index that corresponds to a key stored in the space-time data DB 30 differ from each other, the searching unit 25 converts the first index into a third index with a same index pattern as the index pattern of the second index. The searching unit 25 searches for a key of the space-time data DB 30 using the first index or the third index, searches for a value corresponding to the divided rearward bit string from values of the searched key, and outputs corresponding data included in the searched value as a search result.

The space-time data DB 30 uses a forward bit string of a bit string obtained by converting space-time data as a key and stores a divided rearward bit string and corresponding data that corresponds to the space-time data as values.

FIG. 3 is a diagram showing an example of a data configuration of data to be stored by the space-time data DB 30 shown in FIG. 1. As shown in a list L2 in FIG. 3, the data configuration of data to be stored by the space-time data DB 30 assumes a key-value type having a secondary index portion.

Specifically, as shown in the list L2, the space-time data DB 30 stores data in a configuration having items of a key and a value. In addition, as shown in the list L2, as the value, a secondary index portion and a data portion to store corresponding data are provided. As will be described later, a forward bit string when space-time data is converted into a bit string is stored in the key. In addition, a rearward bit string when the space-time data is converted into a bit string is stored in the secondary index of the value.

Specifically, the list L2 shows that, among the value of the key storing "forward bit string 1", "rearward bit string 1" is stored in the secondary index portion and "data 1" is stored in the data portion. It should be noted that index patterns of indexes (second indexes) A-1 and A-2 which correspond to a key stored in the space-time data DB 30 are both a pattern A.

Returning to FIG. 1, the terminal apparatus 40 will be described. The terminal apparatus 40 is a smartphone or the like owned by the user and has an application 41. The application 41 has a function of requesting the information management apparatus 20 to perform a search for the purposes of route guidance, obstacle point notification, and the like. For example, the terminal apparatus 40 transmits a search request to the information management apparatus 20 with a range criterion of space-time data of a search object as a search criterion.

FIG. 4 is a diagram showing an example of a data configuration of a search request to be transmitted by the terminal apparatus 40 shown in FIG. 1. As shown in a list L3 in FIG. 4, search request data has a data configuration in which a data string indicating a beginning and a data string to be a termination of space-time data that is a search object are associated with each other. In the list L3, a time point, a longitude, and a latitude are indicated for each of a beginning and a termination which indicate a range of space-time data that is a search object. In the example of the list L3, the terminal apparatus 40 requests, as a range criterion of space-time data that is a search object, a range of which a time point is within a range from "2017/1/1 09:00:00" to "2017/1/1 09:15:00", a longitude ranges from "27°" to "28°", and a latitude ranges from "−16°" to "−15°".

Figure 5:
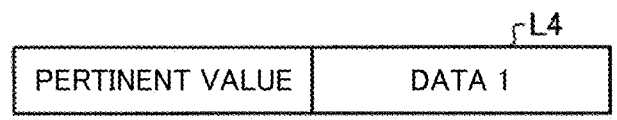
FIG. 5 is a diagram showing an example of a data configuration of a search result to be output by a space-time data management apparatus shown in FIG. 1.

FIG. 5 is a diagram showing an example of a data configuration of a search result to be output by the information management apparatus 20 shown in FIG. 1. The information management apparatus 20 searches for data in the space-time data DB 30 based on the search criterion shown in FIG. 4. In addition, for example, the information management apparatus 20 returns a list L4 shown in FIG. 5 to the terminal apparatus 40 as a search result. As shown in the list L4, the information management apparatus 20 returns "data 1" as a pertinent value that is pertinent to the search criterion.

[Configuration of Space-Time Data Management Apparatus]

Figure 6:
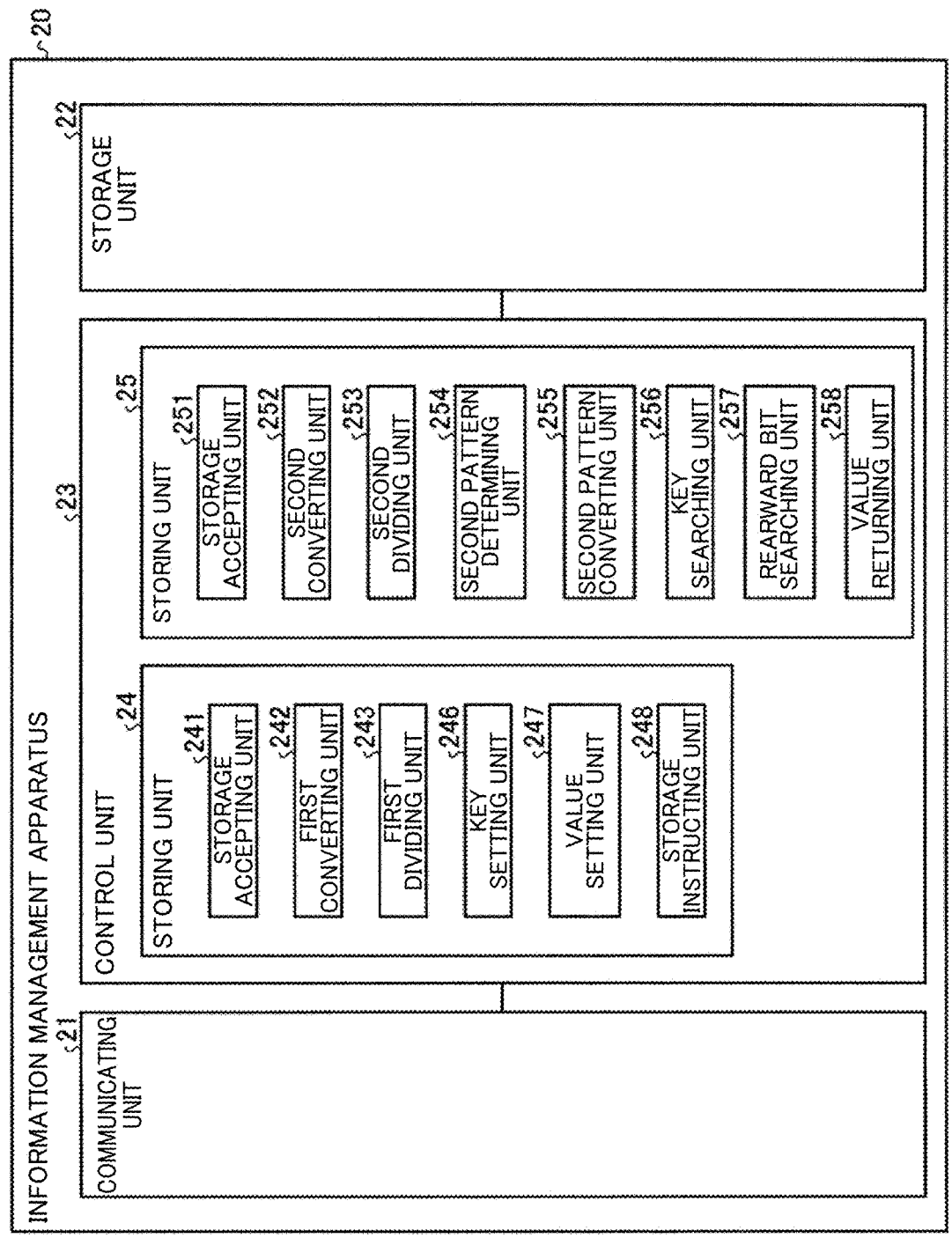
FIG. 6 is a diagram showing an example of a configuration of the space-time data management apparatus shown in FIG. 1.

Next, a configuration of the information management apparatus 20 will be described. FIG. 6 is a diagram showing an example of a configuration of the information management apparatus 20 shown in FIG. 1. As shown in FIG. 6, the information management apparatus 20 includes a communicating unit 21, a storage unit 22, and a control unit 23. It should be noted that the information management apparatus 20 may be a physical server or a virtual server deployed on a physical server.

The communicating unit 21 is a communication interface that transmits and receives various types of information to and from another apparatus connected via a network 2 or the like. The communicating unit 21 is realized by an NIC (Network Interface Card) or the like and performs communication between another apparatus and the control unit 23 (to be described later) via an electric communication line such as a LAN (Local Area Network) or the Internet.

The storage unit 22 is, for example, a storage apparatus such as an HDD (Hard Disk Drive), an SSD (Solid State Drive), or an optical disk. It should be noted that the storage unit 22 may be a semiconductor memory in which data is rewriteable such as a RAM (Random Access Memory), a flash memory, or an NVSRAM (Non Volatile Static Random Access Memory). The storage unit 22 stores an OS (Operating System) and various programs to be executed by the information management apparatus 20. Furthermore, the storage unit 22 stores various kinds of information used when executing the programs.

The control unit 23 controls the entire information management apparatus 20. For example, the control unit 23 is an electronic circuit such as a CPU (Central Processing Unit) or an MPU (Micro Processing Unit) or an integrated circuit such as an ASIC (Application Specific Integrated Circuit) or an FPGA (Field Programmable Gate Array). In addition, the control unit 23 has an internal memory for storing a program that defines various processing procedures and control data and uses the internal memory to execute various types of processing. Furthermore, as the various programs run, the control unit 23 functions as various processing units. The control unit 23 has a storing unit 24 and a searching unit 25.

[Configuration of storing unit] The storing unit 24 has a storage accepting unit 241, a first converting unit 242 (a first bit string converting unit), a first dividing unit 243, a key setting unit 246, a value setting unit 247, and a storage instructing unit 248 (storing unit).

The storage accepting unit 241 accepts input of acquired data transmitted from the data transmission device 10 as data that is a storage object. As described earlier, in acquired data, space-time data including time data and positional data and corresponding data that corresponds to the space-time are associated with each other. Specifically, acquired data has a time point, a longitude, a latitude, and a data portion.

The first converting unit 242 converts space-time data among the acquired data of which input has been accepted into a one-dimensional bit string. In other words, the first converting unit 242 converts a time point, a longitude, and a latitude into a one-dimensional bit string.

The first dividing unit 243 divides the one-dimensional bit string converted by the first converting unit 242 into a forward bit string and a rearward bit string.

The key setting unit 246 performs a setting to store the forward bit string divided by the first dividing unit 243 in a key of the space-time data DB 30. In addition, the value setting unit 247 performs a setting to store the rearward bit string divided by the first dividing unit 243 and corresponding data in a value of the key set by the key setting unit 246 among keys of the space-time data DB 30. The storage instructing unit 248 causes data to be stored in a key and a value which are storage destinations in accordance with settings by the key setting 246 unit and the value setting unit 247.

The storing unit 24 converts space-time data using a one-dimensional bit string conversion method and uses forward bits among the space-time data converted into a one-dimensional bit string as a key. In this manner, since the storing unit 24 creates a key using a one-dimensional bit string conversion method which is relatively simple conversion processing, time required to create a key can be reduced.

[Configuration of searching unit] Next, the searching unit 25 will be described. The searching unit 25 has a search accepting unit 251, a second converting unit 252 (criterion converting unit), a second dividing unit 253, a second pattern determining unit 254, a second pattern converting unit 255 (pattern converting unit), a key searching unit 256, a rearward bit string searching unit 257, and a value returning unit 258 (output unit).

The search accepting unit 251 accepts an input of a search criterion transmitted from the terminal apparatus 40. The search criterion is a range criterion of space-time data that is a search object to be used for route guidance, obstacle point notification, and the like. Specifically, as shown in the list L3 in FIG. 4, search information is information indicating beginnings and terminations of a time point, a longitude, and a latitude.

The second converting unit 252 converts the range criterion of the space-time data that is a search object having been searched into a one-dimensional bit string. The second dividing unit 253 divides the one-dimensional bit string converted by the second converting unit 252 into a forward bit string and a rearward bit string.

The second pattern determining unit 254 determines, based on an arrangement of positional data and time point data of the space-time data that is a search object, an index pattern of a first index corresponding to the forward bit string divided by the second dividing unit 253. In addition, the second pattern determining unit 254 determines whether or not the index pattern of the first index and an index pattern of a second index that corresponds to a key stored in the space-time data DB 30 differ from each other. In other words, the second pattern determining unit 254 determines whether or not the first index that corresponds to the forward bit string of the space-time data that is a search object is an index pattern that differs from an index pattern A of the second index that corresponds to a key stored in the space-time data DB 30.

When the index pattern of the first index and the index pattern of the second index differ from each other, the second pattern converting unit 255 converts the first index into a third index with a same index pattern as the index pattern of the second index. When the first index that corresponds to the forward bit string of the space-time data that is a search object is an index pattern B that differs from the index pattern A of the second index that corresponds to a key stored in the space-time data DB 30, the second pattern converting unit 255 converts the first index into a third index of the index pattern A.

The key searching unit 256 searches for a key from the space-time data DB 30 using the third index. In addition, the rearward bit string searching unit 257 searches for a value that is a forward match with the rearward bit string divided by the second dividing unit from values of the key searched by the key searching unit 256.

The value returning unit 258 outputs the corresponding data included in the value searched by the rearward bit string searching unit 257 as a search result. In other words, the value returning unit 258 returns the corresponding data included in the value searched by the rearward bit string searching unit 257 to the terminal apparatus 40.

Figure 7:
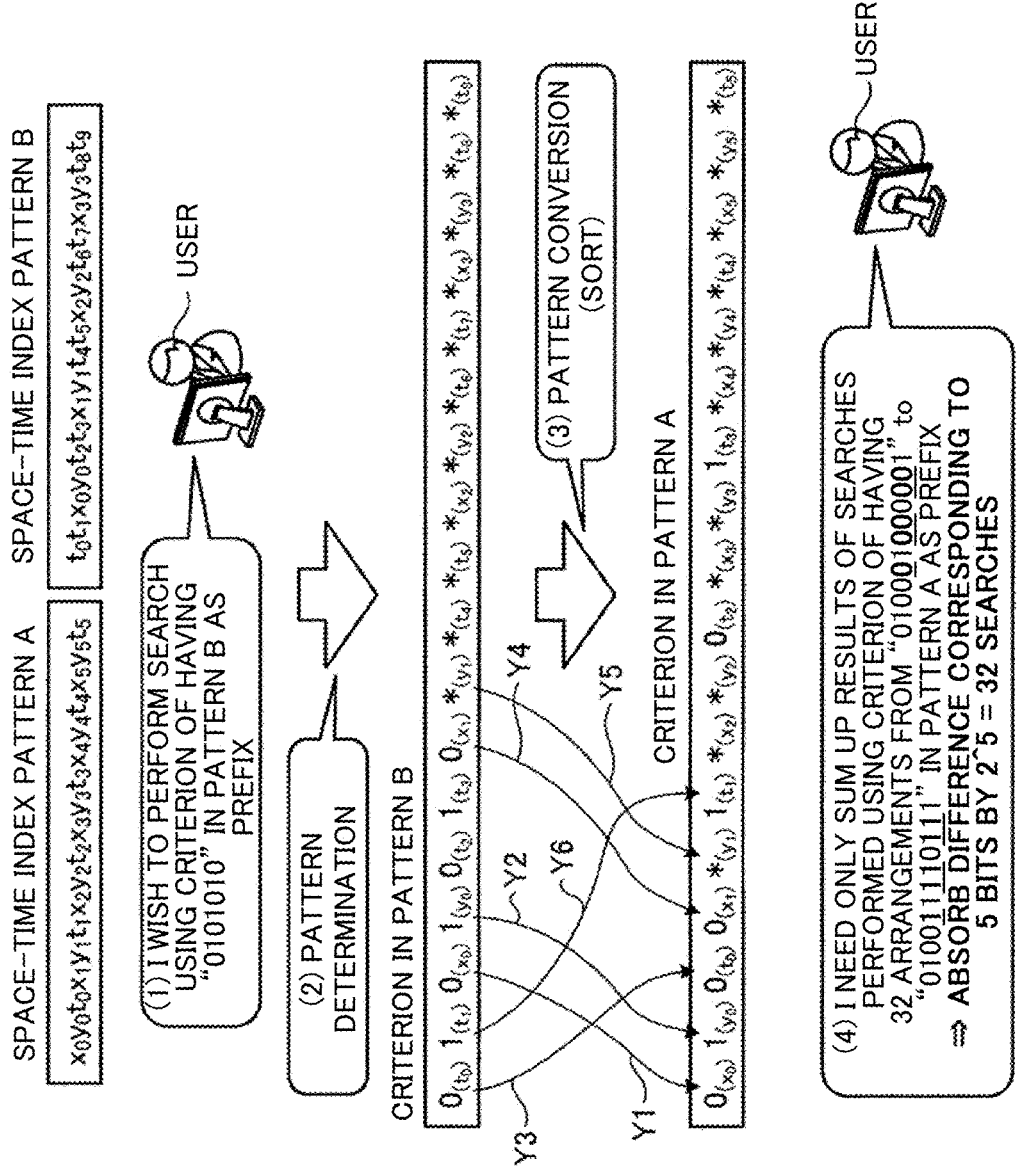
FIG. 7 is a diagram illustrating a flow of search processing by a searching unit shown in FIG. 6.
Figure 8:
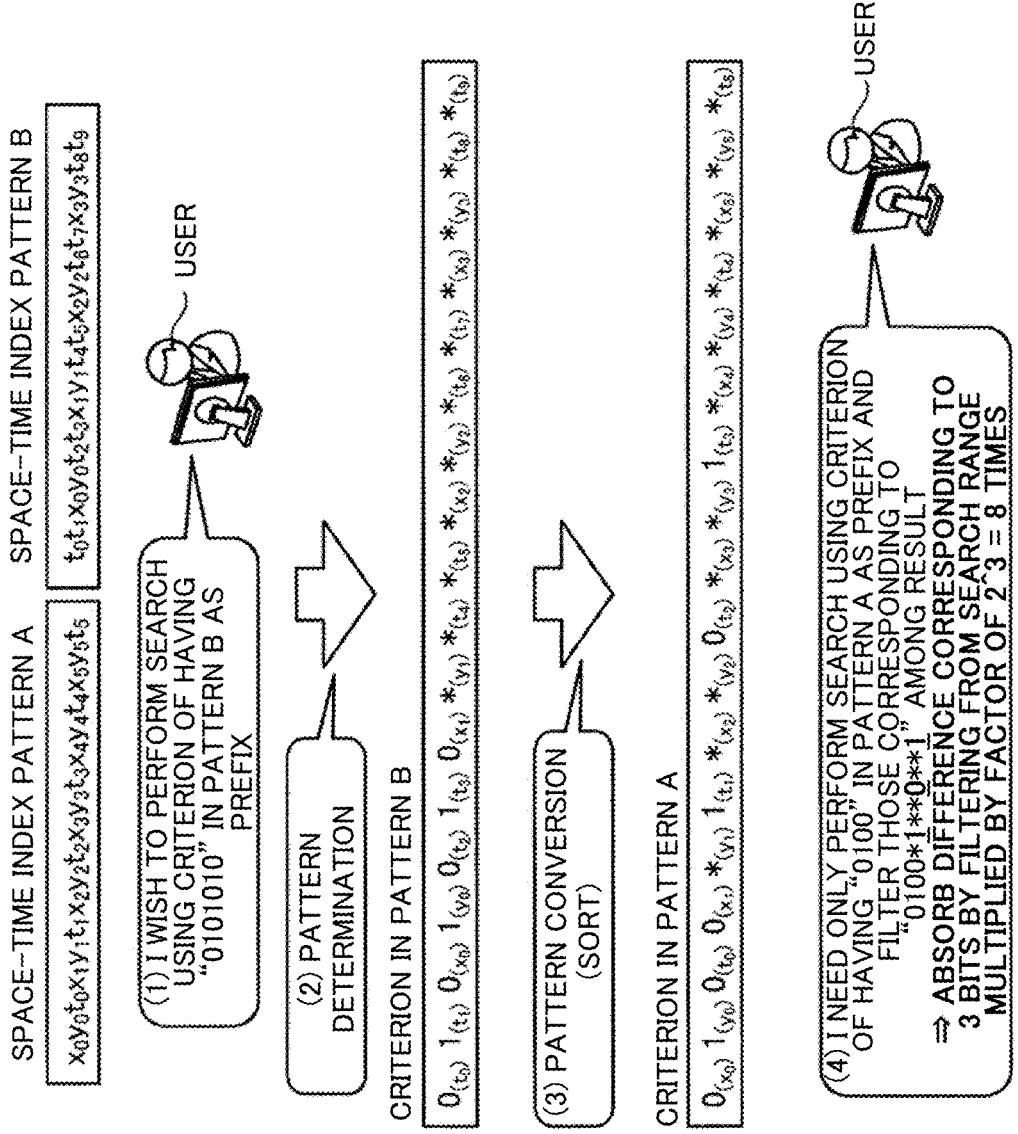
FIG. 8 is a diagram illustrating a flow of search processing by the searching unit shown in FIG. 6.

[Flow of search processing by searching unit] Next, a flow of search processing by the searching unit 25 will be described in specific terms with reference to FIGS. 7 and 8. FIGS. 7 and 8 are diagrams illustrating a flow of the search processing by the searching unit 25 shown in FIG. 6.

In FIG. 7, a search method according to a bottom-up method will be described. First, as shown in FIG. 7, let us assume that an index pattern of a key stored in the space-time data DB 30 is A (refer to a space-time index pattern A) which is arranged in an order of "$x_0 y_0 t_0 x_1 y_1 t_1 x_2 y_2 t_2 x_3 y_3 t_3 x_4 y_4 t_4 x_5 y_5 t_5$". In this case, $x_i$ denotes a bit string of a longitude, $y_i$ denotes a bit string of a latitude, and $t_i$ denotes a bit string of a time point.

Now, for example, a case will be described where the user desires to perform a search using a criterion of having, as a prefix, "0101010" in an index pattern B (refer to a space-time index pattern B) which is arranged in an order of "$t_0 t_1 x_0 y_0 t_2 t_3 x_1 y_1 t_4 t_5 x_2 y_2 t_6 t_7 x_3 y_3 t_8 t_9$" (refer to (1) in FIG. 7). In this case, since the index pattern of "0101010" is B (refer to (2) in FIG. 7), configurations of time data and positional data differ from the index pattern A of the key stored in the space-time data DB 30.

In consideration thereof, in the searching unit 25, the second pattern converting unit 255 converts the prefix "0101010" of the index pattern B into a prefix of the index pattern A (refer to (3) in FIG. 7). In other words, the second pattern converting unit 255 sorts each bit of the prefix "0101010" of the index pattern B in accordance with an arrangement of time data and positional data of the index pattern A.

Specifically, in accordance with the arrangement of "$x_0 y_0 t_0 x_1 y_1 t_1 x_2 y_2 t_2 x_3 y_3 t_3 x_4 y_4 t_4 x_5 y_5 t_5$" of the index pattern A, the second pattern converting unit 255 moves the third "0 ($x_0$)" of the prefix "0101010" of the index pattern B to the top (refer to arrow Y1), moves the fourth "1 ($y_0$)" of the prefix "0101010" of the index pattern B to second (refer to arrow Y2), moves the top "0 ($t_0$)" of the prefix "0101010" of the index pattern B to third (refer to arrow Y3), moves the seventh "0 ($x_1$)" of the prefix "0101010" of the index pattern B to fourth (refer to arrow Y4), and moves the second "1 ($t_1$)" of the prefix "0101010" of the index pattern B to sixth (refer to arrow Y6). It should be noted that, since a bit corresponding to the fifth "$y_1$" of the index pattern A is not included in the prefix "0101010" of the index pattern B, the second pattern converting unit 255 leaves the fifth position blank (refer to arrow Y5). In a similar manner, the second pattern converting unit 255 also sorts seventh and subsequent bits.

In this manner, the second pattern converting unit 255 converts a prefix "0101010*****" of the index pattern B into a prefix "0100*101" of the index pattern A.

In addition, the key searching unit 256 performs a key search as many times as the number of combinations of "0" or "1" to be arranged in blank positions among the prefix "0100*101" of the converted index pattern A. Specifically, the key searching unit 256 need only sum up results of performing key searches of the space-time data DB 30 with a criterion of having, as a prefix, 32 arrangements from "010001000001" to "010011110111" in which "0" or "1" is arranged at fifth, seventh, eighth, tenth, and eleventh positions which are the blank positions of five bits among the prefix "0100*101" of the converted index pattern A (refer to (4) in FIG. 7). In this case, the searching unit 25 absorbs a difference corresponding to the five-bits of blank positions between the prefixes of the index pattern B and the index pattern A by $2^5=32$ number of searches.

In FIG. 8, a search method according to a filter method will be described. In the filter method, when a search using a criterion of having, as a prefix, "0101010" in the pattern B is requested in a similar manner to the bottom-up method, the second pattern converting unit 255 converts a prefix "0101010*****" of the index pattern B into a prefix "0100*101" of the index pattern A (refer to (1) to (3) in FIG. 7).

In addition, the key searching unit 256 performs a search for a key using a predetermined number of bits at the top of an index (the third index) of the converted index pattern A and extracts a key with a same bit arrangement as the third index among the searched keys. Specifically, the key searching unit 256 performs a key search of the space-time data DB 30 with a criterion of having, as a prefix, top four bits "0100" among the converted index pattern A. Subsequently, the key searching unit 256 need only filter those corresponding to "0100*101" among the search result. In this case, the searching unit 25 absorbs a difference corresponding to the three bits of a sixth "1", a ninth "0", and a twelfth "1" of "0100*101" by filtering from a search range multiplied by a factor of $2^3=8$ times.

In this manner, when a key search is instructed using an index of which a pattern differs from an index pattern stored in the space-time data DB 30, the searching unit 25 may execute a key search after converting the index that is a search object into an index of an index pattern stored in the space-time data DB 30.

Figure 9:
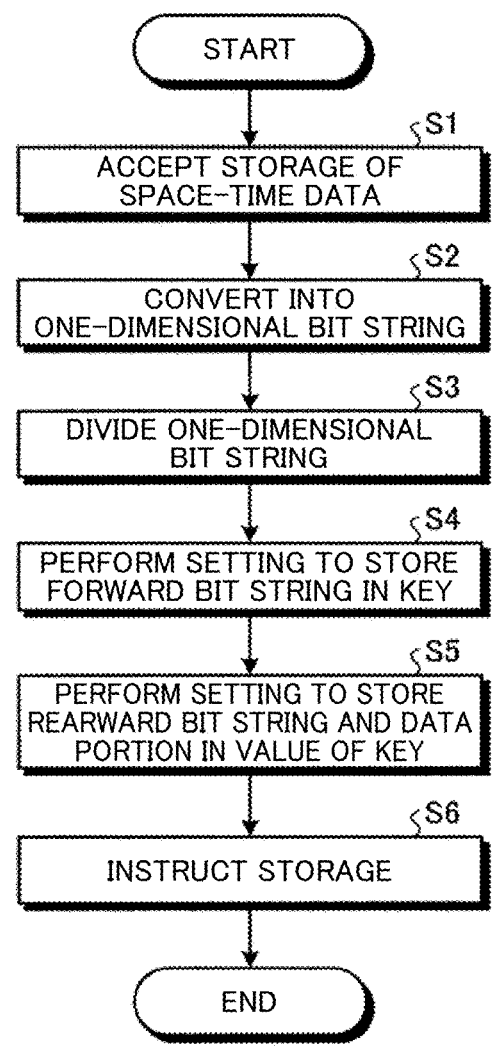
FIG. 9 is a flow chart showing processing procedures of storage processing of information by an information management apparatus shown in FIG. 6.

[Processing procedures of storage processing] Next, processing procedures of storage processing of information by the information management apparatus 20 will be described. FIG. 9 is a flow chart showing processing procedures of storage processing of information by the information management apparatus 20 shown in FIG. 6.

As shown in FIG. 9, when the storage accepting unit 241 accepts an input of acquired data transmitted from the data transmission device 10 (step S1), the first converting unit 242 converts a time point, a longitude, and a latitude which represent space-time data among the acquired data of which input has been accepted into a one-dimensional bit string (step S2). Subsequently, the first dividing unit 243 divides the one-dimensional bit string converted by the first converting unit 242 into a forward bit string and a rearward bit string (step S3).

The key setting unit 246 performs a setting to store the forward bit string divided by the first dividing unit 243 in a key of the space-time data DB 30 (step S4). In addition, the value setting unit 247 performs a setting to store the rearward bit string divided by the first dividing unit 243 and corresponding data in a value of the key set by the key setting unit 246 (step S5). The storage instructing unit 248 issues an instruction to cause data to be stored in the space-time data DB 30 in accordance with settings by the key setting 246 unit and the value setting unit 247 (step S6), and ends the storage processing.

Figure 10:
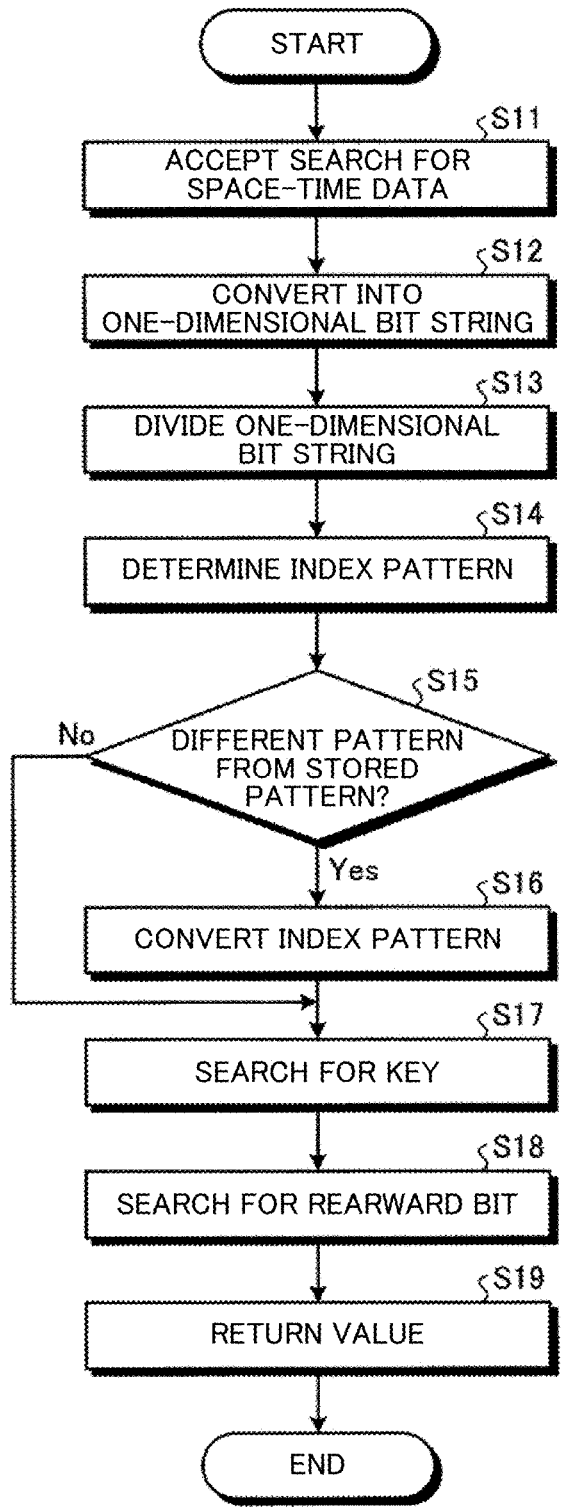
FIG. 10 is a flow chart showing processing procedures of storage processing of information by a space-time data management apparatus shown in FIG. 6.

[Processing procedures of search processing] Next, processing procedures of search processing of information by the information management apparatus 20 will be described. FIG. 10 is a flow chart showing processing procedures of search processing of information by the information management apparatus 20 shown in FIG. 6.

As shown in FIG. 10, first, the search accepting unit 251 accepts an input of space-time data indicating beginnings and terminations of a time point, a longitude, and a longitude having been transmitted from the terminal apparatus 40 as a search criterion (step S11). In addition, the second converting unit 252 converts an input value into a one-dimensional bit string (step S12). The second dividing unit 253 divides the one-dimensional bit string converted by the second converting unit 252 into a forward bit string and a rearward bit string (step S13).

Subsequently, the second pattern determining unit 254 determines, based on an arrangement of positional data and time point data of the space-time data that is a search object, an index pattern of a first index corresponding to the forward bit string divided by the second dividing unit 253 (step S14). The second pattern determining unit 254 determines whether or not the index pattern of the first index and an index pattern of a second index that corresponds to a key stored in the space-time data DB 30 differ from each other (step S15).

When the index pattern of the first index and the index pattern of the second index that corresponds to a key stored in the space-time data DB 30 differ from each other (step S15: Yes), the second pattern converting unit 255 converts the first index into a third index with a same index pattern as the index pattern of the second index (step S16).

In addition, when the index pattern of the first index and the index pattern of the second index are the same (step S15: No) or once step S16 is concluded, the key searching unit 256 performs a key search (step S17). When the index pattern of the first index and the index pattern of the second index are the same, the key searching unit 256 uses the first index as it is as a key. Alternatively, when the index pattern of the first index and the index pattern of the second index differ from each other, the key searching unit 256 uses the third index as a key. The key searching unit 256 searches for a key that matches (that is equivalent to) the first index or the third index from the space-time data DB 30.

In addition, with respect to a rearward bit string that is present in a value of the key searched by the key searching unit 256, the rearward bit string searching unit 257 searches for a value that is a forward match with the rearward bit string divided by the second dividing unit (step S18).

The value returning unit 258 returns corresponding data included in the value searched by the rearward bit string searching unit 257 to the terminal apparatus 40 as a value pertinent to the search (step S19) and ends the search processing.

Figure 11:
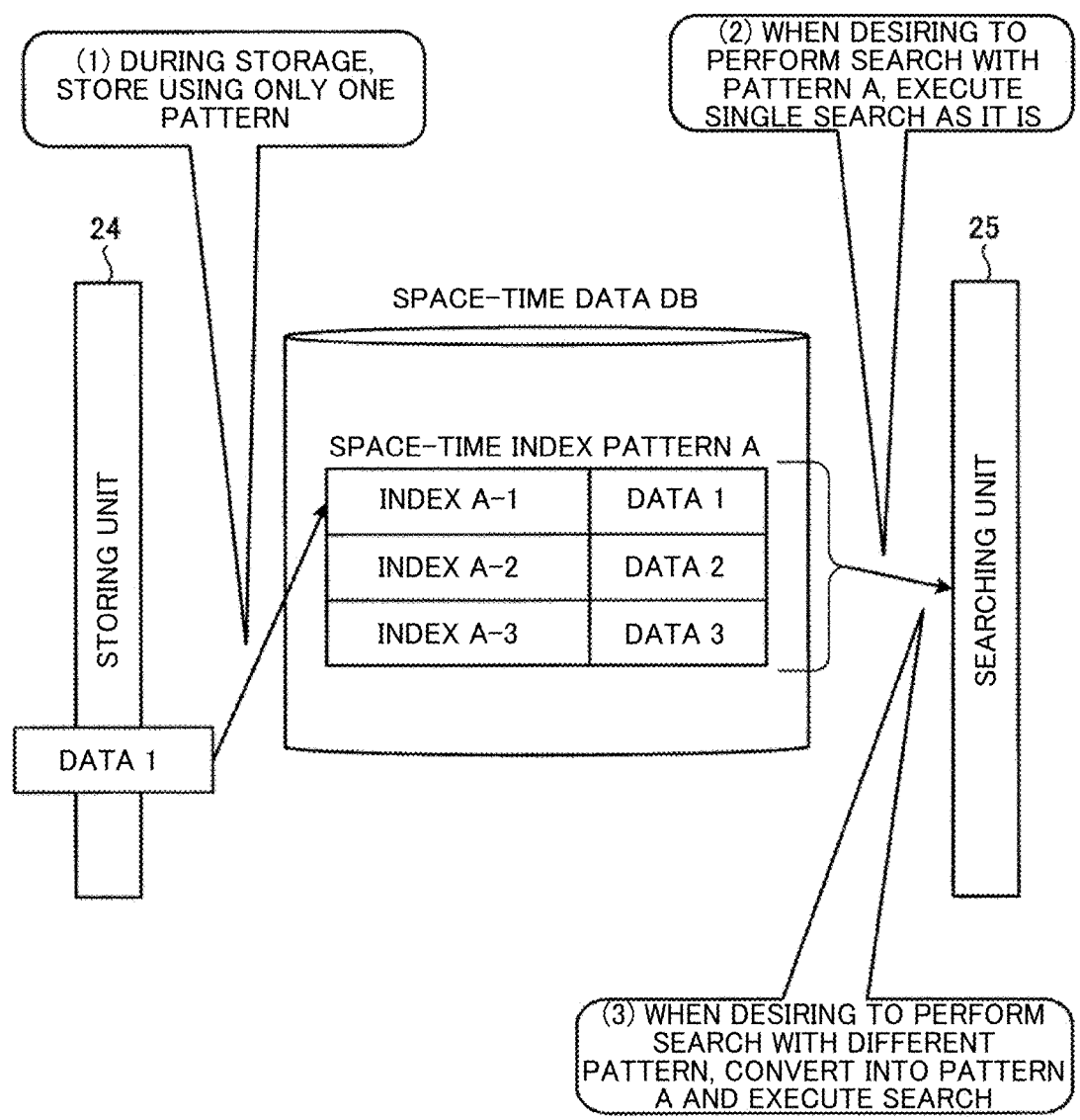
FIG. 11 is a diagram illustrating an effect of the first embodiment.

[Effect of first embodiment] FIG. 11 is a diagram illustrating an effect of the first embodiment. As shown in FIG. 11, in the first embodiment, during storage, respective pieces of data 1, 2, and 3 are stored using indexes A-1, A-2, and A-3 of only one pattern (the pattern A) (refer to (1) in FIG. 11). In addition, when desiring to perform a key search with an index of the pattern A, a search can be performed by executing a single search as it is (refer to (2) in FIG. 11). Furthermore, when desiring to perform a key search with an index of a different pattern (the pattern B), a search may be executed by converting the index pattern of the index into the pattern A (refer to (3) in FIG. 11).

In this manner, when the index pattern of the first index that corresponds to the forward bit string and the index pattern of the second index that corresponds to a key stored in the space-time data DB 30 differ from each other, the information management apparatus 20 converts the first index into a third index with a same index pattern as the index pattern of the second index. In addition, the information management apparatus 20 searches for a key using the third index.

Therefore, even when the first index that corresponds to the forward bit string of the space-time data that is a search object is an index pattern B that differs from the index pattern A of the second index that corresponds to a key stored in the space-time data DB 30, the information management apparatus 20 realizes a key search by converting the first index into a third index of the index pattern A.

In other words, the information management apparatus 20 performs a key search by converting an index pattern of an index corresponding to the space-time data that is a search object in accordance with an index pattern of an index that corresponds to a key stored in the space-time data DB 30. Therefore, in the present first embodiment, the space-time data DB 30 need not store data in a multiplexed manner for each of a plurality of index patterns. Therefore, according to the present first embodiment, an amount of accumulated data can be reduced in a data search including space-time data. In addition, the present first embodiment is not limited to a space-time index pattern that corresponds to a key stored in the space-time data DB 30 and is capable of flexibly accommodating search patterns of a plurality of space-time indexes.

It should be noted that the space-time data DB 30 may be constituted of a plurality of nodes which are key-value stores so that acquired data can be stored in a distributed manner. When the space-time data DB 30 is constituted of a plurality of nodes, the storing unit 24 may calculate a hash value of a forward bit string converted by the first converting unit 242 and select a node to be a storage destination based on the hash value. In addition, when the space-time data DB 30 is constituted of a plurality of nodes, the searching unit 25 may calculate a hash value of a forward bit string divided by the second dividing unit 253 and obtain a node to be a search destination based on the hash value.

In addition, the information management apparatus 20 may create a combination table of nodes that are storage destinations in advance and, during storage, select a combination of nodes using a value of a forward bit divided by the first dividing unit 243 as a key and perform storage processing in any of the selected nodes. In this case, in the information management apparatus 20, during a search, a combination of nodes that are search destinations is obtained using a value of a forward bit divided by the second dividing unit 253 as a key and a search is performed with respect to the obtained combination of nodes.

Furthermore, the space-time data DB 30 may be a data storage system in which a plurality of nodes 1 to N operate in a cluster configuration. The information management apparatus 20 calculates a label number with respect to information that is a storage object, causes a divided forward bit string and the label number to be stored in a key, and causes a divided rearward bit string and corresponding data to be stored in a data storage system 230. In addition, the information management apparatus 20 searches for a key of which a forward bit of a one-dimensional bit string converted from a range criterion of the space-time data that is a search object and the label number are equivalent to each other from nodes that are search destinations, searches for a value corresponding to a divided rearward bit string, and outputs corresponding data included in the searched value as a search result.

Second Embodiment

Next, a second embodiment will be described. In the second embodiment, an index that is a storage object is converted into a first composite index having a composite index pattern in which elements of two index patterns to be used as search objects are alternately combined and data is stored by setting the converted first composite index as a key. In addition, in the second embodiment, an index corresponding to a forward bit string of a bit string converted from space-time data that is a search object is converted into a second composite index having the composite index pattern and a key search is performed using the converted second composite index.

[Configuration of Space-Time Data Management Apparatus]

Figure 12:
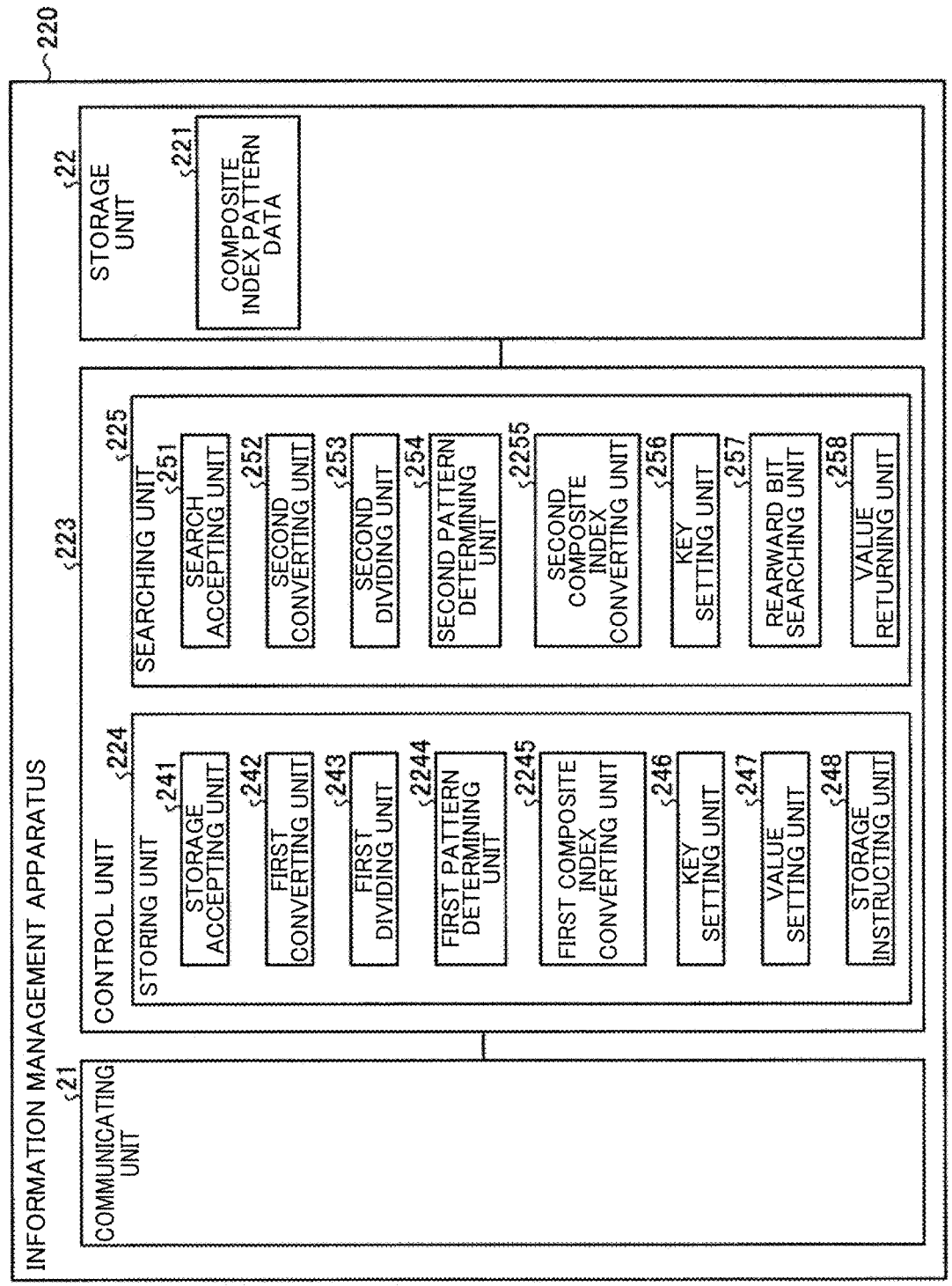
FIG. 12 is a diagram showing an example of a configuration of an information management apparatus according to a second embodiment.

First, a configuration of an information management apparatus according to the second embodiment will be described. FIG. 12 is a diagram showing an example of a configuration of an information management apparatus 220 according to the second embodiment. As shown in FIG. 12, compared to the information management apparatus 20, the information management apparatus 220 includes a control unit 223 having a storing unit 224 and a searching unit 225.

In addition, a storage unit 22 stores composite index pattern data 221. A composite index pattern is an index pattern in which elements of two index patterns which have mutually different configurations and which are to be adopted as search objects are alternately combined for each unit of the time data or the positional data. In a composite index pattern, a pattern is set so that same elements do not overlap with each other.

[Configuration of storing unit] The storing unit 224 has a storage accepting unit 241, a first converting unit 242 (a first bit string converting unit), a first dividing unit 243, a first pattern determining unit 2244, a first composite index converting unit 2245, a key setting unit 246, a value setting unit 247, and a storage instructing unit 248 (storing unit). The storage accepting unit 241, the first converting unit 242, the first dividing unit 243, the key setting unit 246, the value setting unit 247, and the storage instructing unit 248 perform same processing steps as the first converting unit 242, the first dividing unit 243, the value setting unit 247, and the storage instructing unit 248 shown in FIG. 6.

The first pattern determining unit 2244 determines, based on an arrangement of positional data and time point data of space-time data that is a storage object, a type of an index pattern of a first index corresponding to a forward bit string of a bit string converted by the first converting unit 242.

In accordance with a determination result of the first pattern determining unit 2244, the first composite index converting unit 2245 converts the first index into a first composite index having a composite index pattern. The key setting unit 246 sets the first composite index as a key. As a result, a rearward bit string divided by the first dividing unit 243 and corresponding data are stored in a value of which a key is the first composite index.

[Configuration of searching unit] Next, the searching unit 225 will be described. The searching unit 225 has a search accepting unit 251, a second converting unit 252 (criterion converting unit), a second dividing unit 253, a second pattern determining unit 254, a second composite index converting unit 2255, a key searching unit 256, a rearward bit string searching unit 257, and a value returning unit 258 (output unit). The search accepting unit 251, the second converting unit 252, the second dividing unit 253, the second pattern determining unit 254, the key searching unit 256, the rearward bit string searching unit 257, and the value returning unit 258 perform same processing steps as the search accepting unit 251, the second converting unit 252, the second dividing unit 253, the second pattern determining unit 254, the key searching unit 256, the rearward bit string searching unit 257, and the value returning unit 258 shown in FIG. 6.

The second composite index converting unit 2255 converts a second index corresponding to a forward bit string of a bit string having been converted by the second converting unit 252 into a second composite index having the composite index pattern. The key searching unit 256 sets the second composite index as a key. As a result, the searching unit 225 searches for a key using the second composite index and outputs corresponding data included in a value of the searched key as a search result.

[Composite index pattern] Next, setting processing of a composite index pattern will be described with reference to FIGS. 13 to 23. FIGS. 13 to 23 are diagrams illustrating the setting processing of a composite index pattern.

For example, a case where two index patterns to be adopted as search objects are a space-time index pattern A and a space-time index pattern B will be described as an example. A composite index pattern A+B is set by alternately combining elements of the two space-time index patterns A and B for each unit of time data or positional data.

Figure 13:
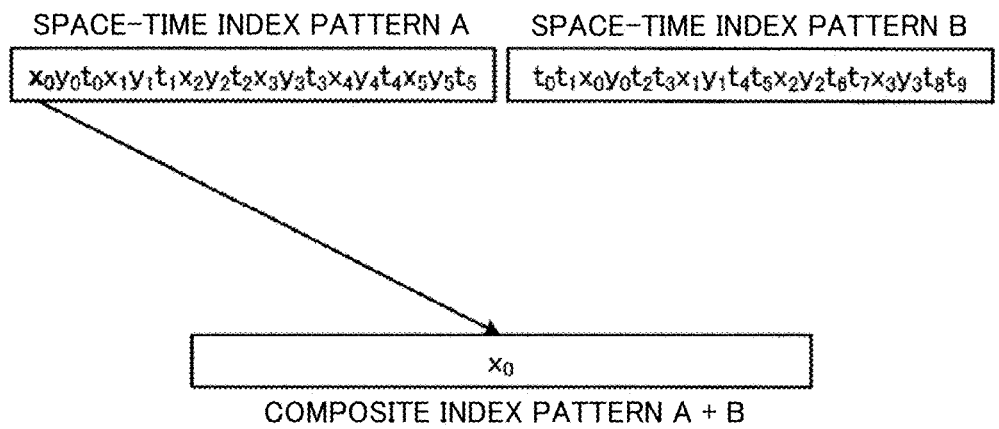
FIG. 13 is a diagram illustrating setting processing of a composite index pattern.
Figure 14:
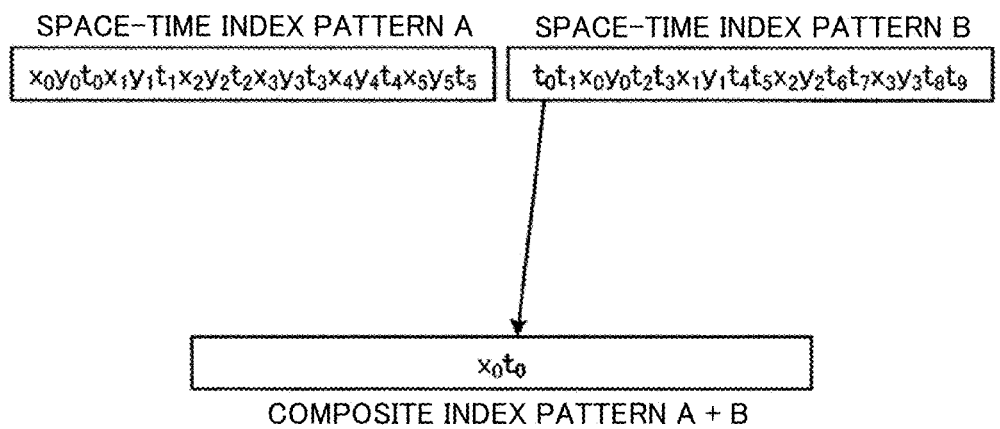
FIG. 14 is a diagram illustrating setting processing of a composite index pattern.

First, as an element of a top of the composite index pattern A+B, an element "$x_0$" at the top of the index pattern A among the space-time index patterns A and B is adopted (refer to FIG. 13). In addition, as a second element of the composite index pattern A+B, an element "$t_0$" at the top of the space-time index pattern B is adopted (refer to FIG. 14).

Figure 15:
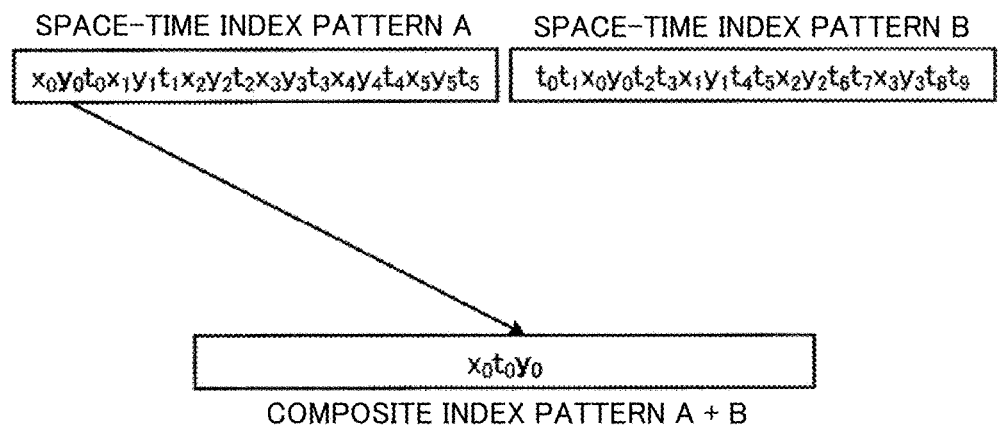
FIG. 15 is a diagram illustrating setting processing of a composite index pattern.
Figure 16:
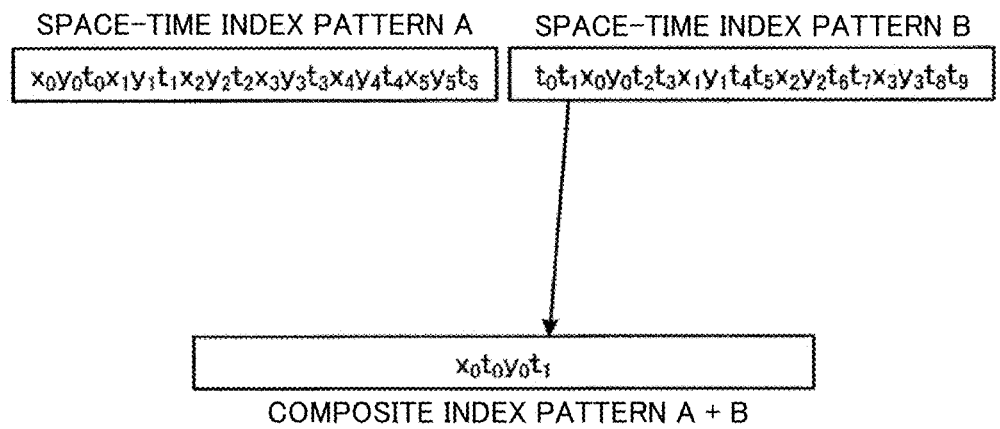
FIG. 16 is a diagram illustrating setting processing of a composite index pattern.

As a third element of the composite index pattern A+B, a second element "$y_0$" of the space-time index pattern A is adopted (refer to FIG. 15). As a fourth element of the composite index pattern A+B, a second element "$t_1$" of the space-time index pattern B is adopted (refer to FIG. 16).

Figure 17:
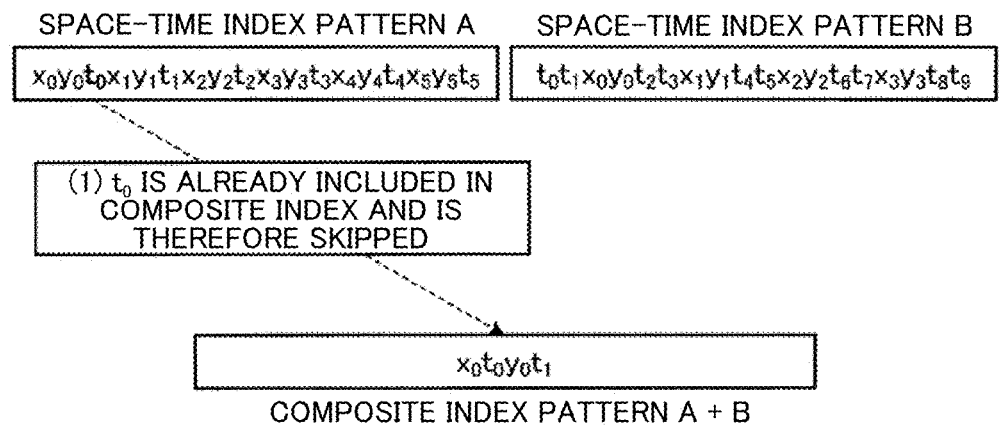
FIG. 17 is a diagram illustrating setting processing of a composite index pattern.
Figure 18:
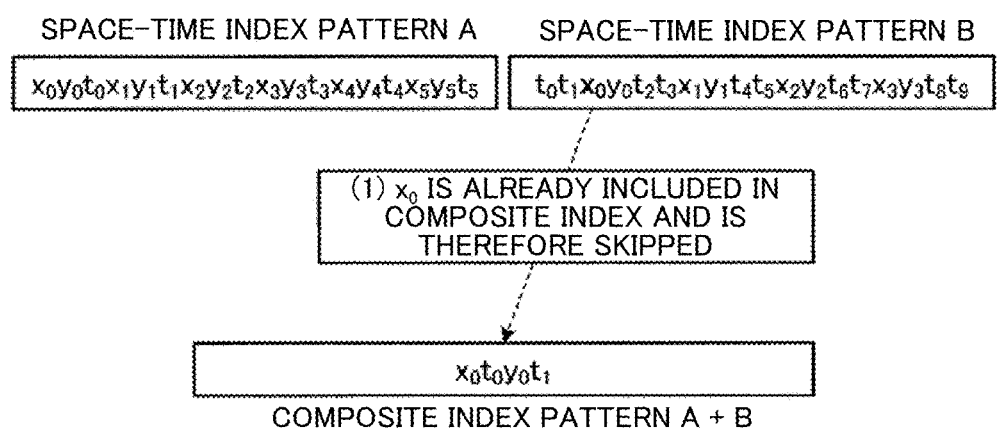
FIG. 18 is a diagram illustrating setting processing of a composite index pattern.

At this point, since a third element "$t_0$" of the space-time index pattern A is already included in the composite index pattern A+B, the third element "$t_0$" is not adopted as an element of the composite index pattern A+B and is skipped (refer to (1) in FIG. 17). In a similar manner, since a third element "$x_0$" of the space-time index pattern B is already included in the composite index pattern A+B, the third element "$x_0$" is not adopted as an element of the composite index pattern A+B and is skipped (refer to (1) in FIG. 18).

Figure 19:
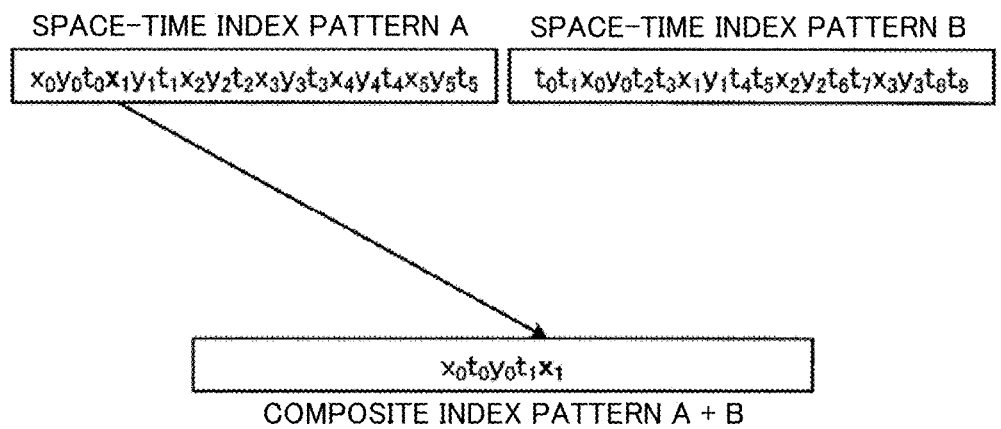
FIG. 19 is a diagram illustrating setting processing of a composite index pattern.
Figure 20:
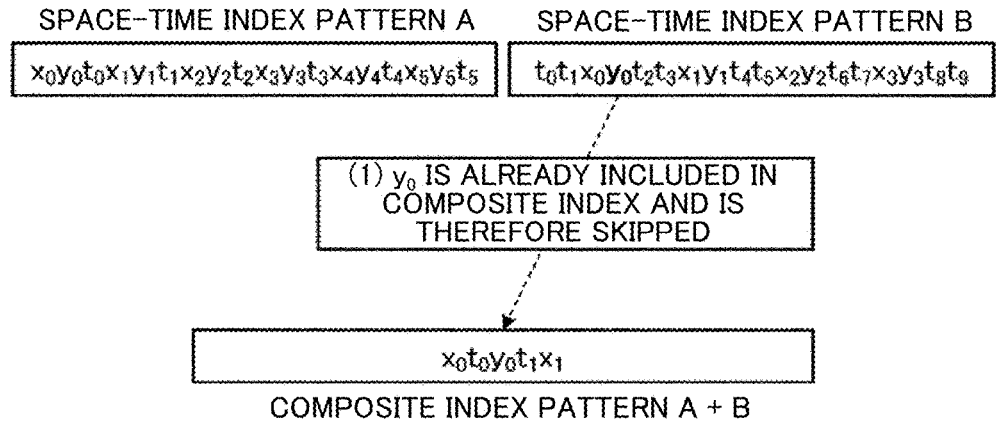
FIG. 20 is a diagram illustrating setting processing of a composite index pattern.

In addition, as a fifth element of the composite index pattern A+B, a fourth element "$x_1$" of the space-time index pattern A is adopted (refer to FIG. 19). At this point, since a fourth element "$y_0$" of the space-time index pattern B is already included in the composite index pattern A+B, the fourth element "$y_0$" is not adopted as an element of the composite index pattern A+B and is skipped (refer to (1) in FIG. 20).

Figure 21:
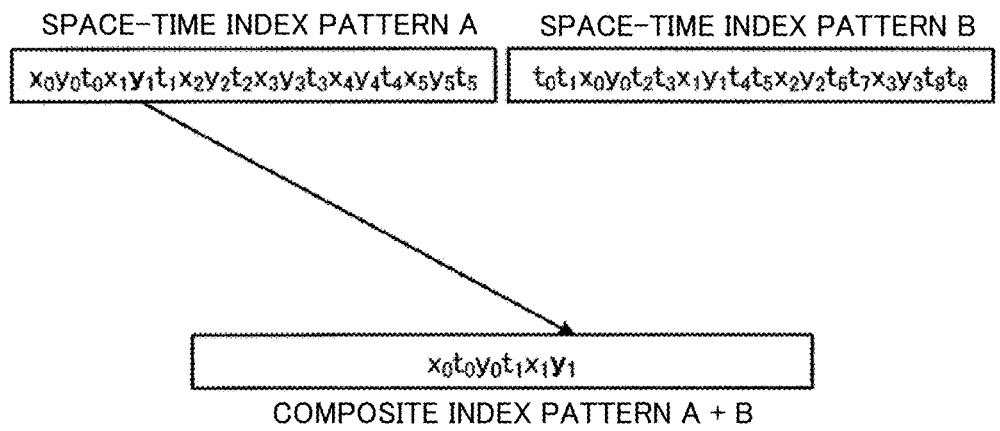
FIG. 21 is a diagram illustrating setting processing of a composite index pattern.
Figure 22:
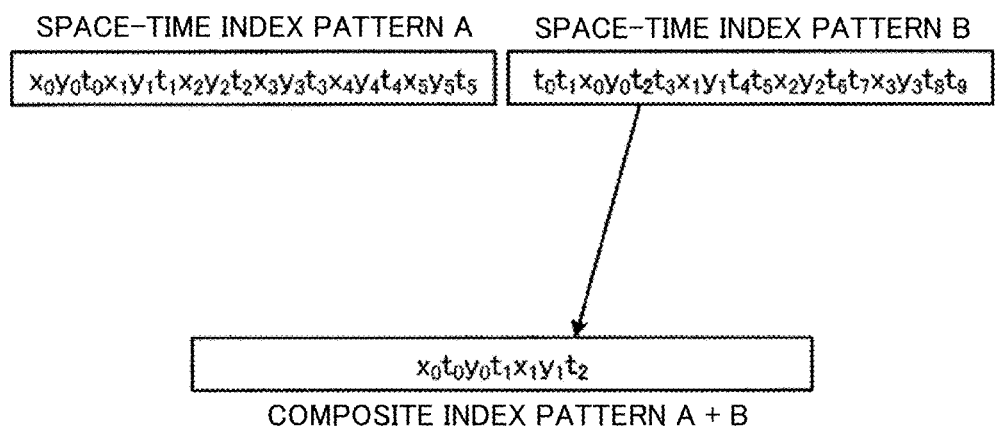
FIG. 22 is a diagram illustrating setting processing of a composite index pattern.
Figure 23:
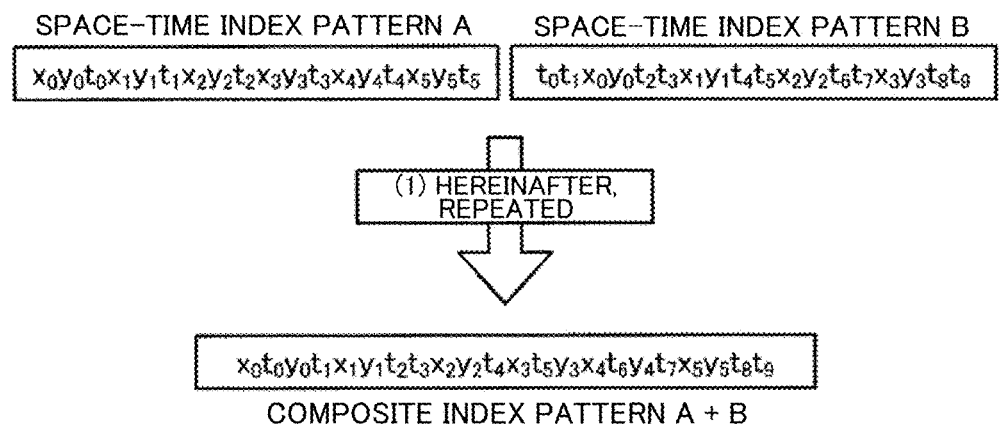
FIG. 23 is a diagram illustrating setting processing of a composite index pattern.

In addition, as a sixth element of the composite index pattern A+B, a fifth element "$y_1$" of the space-time index pattern A is adopted (refer to FIG. 21). As a seventh element of the composite index pattern A+B, a fifth element "$t_2$" of the space-time index pattern B is adopted (refer to FIG. 22). Thereafter, by repeating the processing described above (refer to (1) in FIG. 23), "$x_0 t_0 y_0 t_1 x_1 y_1 t_2 t_3 x_2 y_2 t_4 x_3 t_5 y_3 x_4 t_6 y_4 t_7 x_5 y_5 t_8 t_9$" is set as the composite index pattern A+B (refer to FIG. 23).

The storing unit 224 converts the first index into a first composite index having the composite index pattern A+B "$x_0 t_0 y_0 t_1 x_1 y_1 t_2 t_3 x_2 y_2 t_4 x_3 t_5 y_3 x_4 t_6 y_4 t_7 x_5 y_5 t_8 t_9$" and stores data by using the converted first composite index as a key.

Figure 24:
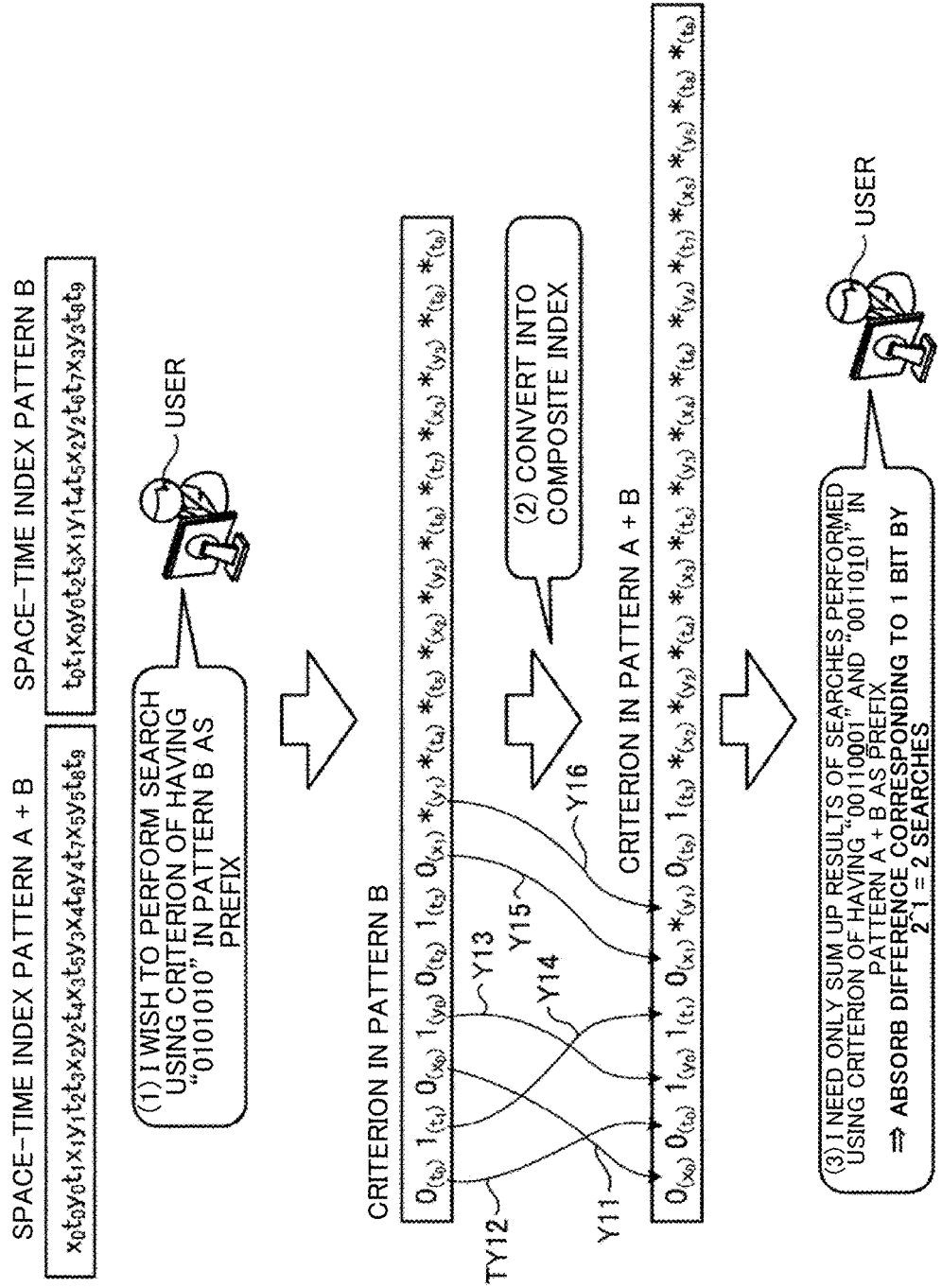
FIG. 24 is a diagram illustrating a flow of search processing by a searching unit shown in FIG. 12.
Figure 25:
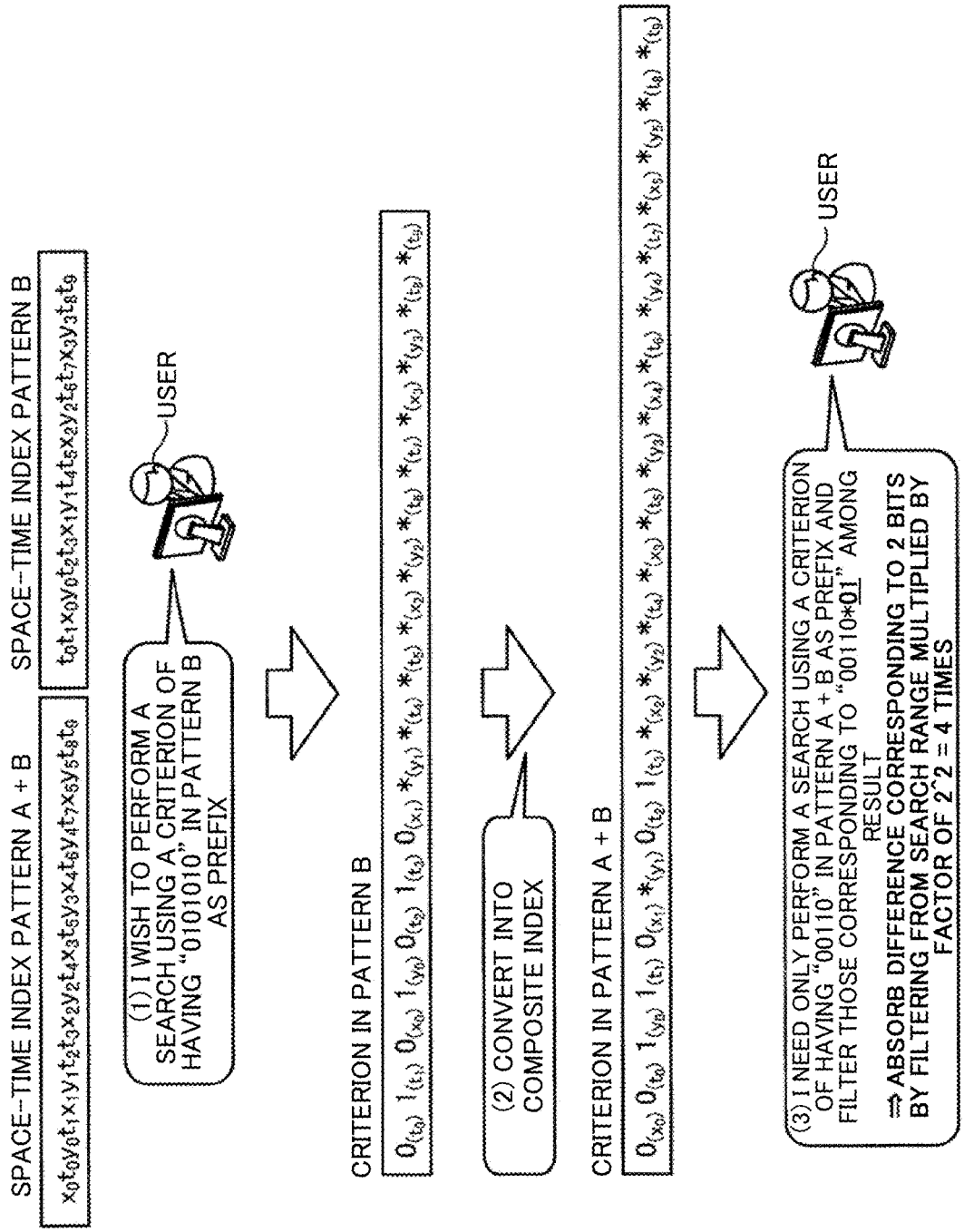
FIG. 25 is a diagram illustrating a flow of search processing by the searching unit shown in FIG. 12.

[Flow of processing of searching unit] The searching unit 225 converts the second index into a second composite index having the composite index pattern A+B "$x_0 t_0 y_0 t_1 x_1 y_1 t_2 t_3 x_2 y_2 t_4 x_3 t_5 y_3 x_4 t_6 y_4 t_7 x_5 y_5 t_8 t_9$" which is a storage pattern and performs a search by using the second composite index as a key. In consideration thereof, a flow of search processing by the searching unit 225 will be described in specific terms with reference to FIGS. 24 and 25. FIGS. 24 and 25 are diagrams illustrating a flow of the search processing by the searching unit 225 shown in FIG. 12.

In FIG. 24, a search method according to a bottom-up method will be described. As shown in FIG. 25, let us assume that an index pattern of a key stored in the space-time data DB 30 is the composite index pattern A+B which is arranged in an order of "$x_0 t_0 y_0 t_1 x_1 y_1 t_2 t_3 x_2 y_2 t_4 x_3 t_5 y_3 x_4 t_6 y_4 t_7 x_5 y_5 t_8 t_9$".

Now, for example, a case will be described where the user desires to perform a search using a criterion of having, as a prefix, "0101010" in an index pattern B which is arranged in an order of "$t_0 t_1 x_0 y_0 t_2 t_3 x_1 y_1 t_4 t_5 x_2 y_2 t_6 t_7 x_3 y_3 t_8 t_9$" (refer to (1) in FIG. 24). In this case, since the index pattern of "0101010" is B, in the searching unit 25, the second composite index converting unit 2255 converts the prefix "0101010" of the index pattern B into a composite index having the composite index pattern A+B (refer to (2) in FIG. 24). In other words, the second composite index converting unit 2255 sorts each bit of the prefix "0101010" of the index pattern B in accordance with an arrangement of time data and positional data of the composite index pattern A+B.

Specifically, in accordance with the arrangement of "$x_0 t_0 y_0 t_1 x_1 y_1 t_2 t_3 x_2 y_2 t_4 x_3 t_5 y_3 x_4 t_6 y_4 t_7 x_5 y_5 t_8 t_9$" of the composite index pattern A+B, the second composite index converting unit 2255 moves the third "0 ($x_0$)" of the prefix "0101010" of the index pattern B to the top (refer to arrow Y11), moves the first "0 ($t_0$)" of the prefix "0101010" of the index pattern B to second (refer to arrow Y12), moves the fourth "1 ($y_0$)" of the prefix "0101010" of the index pattern B to third (refer to arrow Y13), moves the second "1 ($t_1$)" of the prefix "0101010" of the index pattern B to fourth (refer to arrow Y14), and moves the seventh "0 ($x_1$)" of the prefix "0101010" of the index pattern B to fifth (refer to arrow Y15). It should be noted that, since a bit corresponding to the sixth "$y_1$" of the composite index pattern A+B is not included in the prefix "0101010" of the index pattern B, the second composite index converting unit 2255 leaves the sixth position blank (refer to arrow Y16).

In this manner, the second composite index converting unit 2255 converts a prefix "0101010*" of the index pattern B into a prefix "00110*01" of the composite index pattern A+B.

In addition, the key searching unit 256 performs a key search as many times as the number of combinations of "0" or "1" to be arranged in the blank position among the prefix "00110*01" of the composite index pattern A+B. Specifically, the key searching unit 256 need only sum up results of performing key searches of the space-time data DB 30 with a criterion of having, as a prefix, two arrangements of "00110001" and "00110101" in which "0" or "1" is arranged at a sixth position which is the blank position among the prefix "00110*01" of the composite index pattern A+B (refer to (3) in FIG. 24). In this case, the searching unit 225 absorbs a difference corresponding to the one bit of blank positions between the prefixes of the index pattern B and the composite index pattern A+B by $2^1=2$ number of searches.

In FIG. 25, a search method according to a filter method will be described. In the filter method, when a search using a criterion of having, as a prefix, "0101010" in the pattern B is requested in a similar manner to the bottom-up method, the second composite index converting unit 2255 converts a prefix "0101010*" of the index pattern B into a prefix "00110*01" of the composite index pattern A+B (refer to (1) and (2) in FIG. 25).

In addition, the key searching unit 256 performs a key search of the space-time data DB 30 with a criterion of having, as a prefix, top five bits "00110" among the prefix "00110*01" of the composite index pattern A+B. Subsequently, the key searching unit 256 need only filter those corresponding to "00110*01" among the search result. In this case, the searching unit 225 absorbs a difference corresponding to two bits of "00110*01" by filtering from a search range multiplied by a factor of $2^2=4$ times.

Figure 26:
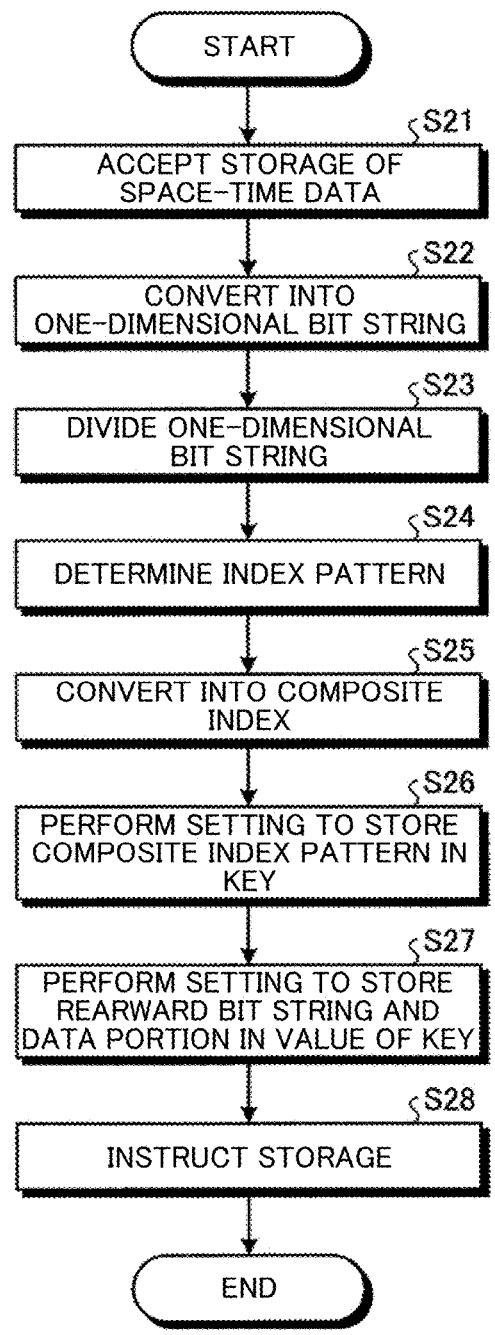
FIG. 26 is a flow chart showing processing procedures of storage processing of information by an information management apparatus shown in FIG. 12.

[Processing procedures of storage processing] Next, processing procedures of storage processing of information by the information management apparatus 220 will be described. FIG. 26 is a flowchart showing processing procedures of storage processing of information by the information management apparatus 220 shown in FIG. 12.

Step S21 to step S23 shown in FIG. 26 are processing steps similar to step S1 to step S3 shown in FIG. 9. The first pattern determining unit 2244 determines a type of an index pattern of a first index corresponding to the forward bit string divided by the first dividing unit 243 (step S24).

In addition, the first composite index converting unit 2245 converts the first index into a first composite index having a composite index pattern (step S25). The key setting unit 246 sets the first composite index as a key (step S26). Steps S27 and S28 shown in FIG. 26 are processing steps similar to steps S5 and S6 shown in FIG. 12.

Figure 27:
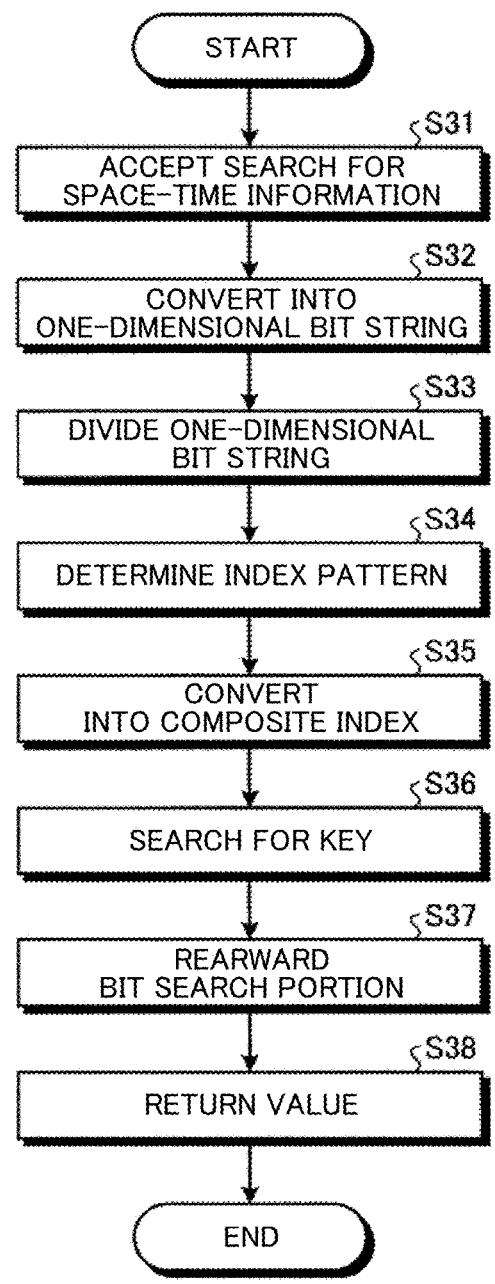
FIG. 27 is a flow chart showing processing procedures of search processing of information by the information management apparatus shown in FIG. 12.

[Processing procedures of search processing] Next, processing procedures of search processing of information by the information management apparatus 220 will be described. FIG. 27 is a flow chart showing processing procedures of search processing of information by the information management apparatus 220 shown in FIG. 12.

Step S31 to step S34 shown in FIG. 27 are processing steps similar to step S11 to step S14 shown in FIG. 10. The second composite index converting unit 2255 converts a second index corresponding to a forward bit string having been divided by the second dividing unit 253 into a second composite index having a composite index pattern (step S35). In addition, the key searching unit 256 sets the second composite index as a key (step S36). Steps S37 and S38 shown in FIG. 27 are processing steps similar to steps S18 and S19 shown in FIG. 10.

[Effect of second embodiment] In the information management apparatus 220 according to the second embodiment, an index that is a storage object is converted into a first composite index having a composite index pattern in which elements of two index patterns to be used as search objects are alternately combined and data is stored using the converted first composite index as a key.

In this manner, in the information management apparatus 220, even when configurations of space-time data include two types of configurations such as a first data configuration and a second data configuration that differs from the first data configuration, a first composite index having a composite index pattern in which elements of a first index pattern that corresponds to the first data configuration and elements of a second index pattern that corresponds to the second data configuration are alternately combined in units of time data or positional data is set as a key for storage.

Accordingly, the space-time data DB 30 need not store data in a multiplexed manner for each of a plurality of index patterns. Therefore, according to the present second embodiment, an amount of accumulated data can be reduced in a data search including space-time data.

In addition, in the information management apparatus 220, an index corresponding to a forward bit string of a bit string converted from space-time data that is a search object is converted into a second composite index having a composite index pattern and a key search is performed using the converted second composite index.

Therefore, since the information management apparatus 220 performs a key search by converting an index pattern of an index corresponding to space-time data that is a search object in accordance with a composite index pattern that corresponds to a key stored in the space-time data DB 30, the information management apparatus 220 can flexibly accommodate search patterns of a plurality of space-time indexes. In addition, in the information management apparatus 220, since the number of searches can be reduced and a search range can be contracted as compared to the first embodiment by adopting any of a bottom-up method and a filter method, search processing can be accelerated.

[System configuration and the like] It is to be understood that each illustrated component of each apparatus is functionally conceptual and it is not required that each component of each apparatus be physically constructed as illustrated. In other words, specific modes of distribution and/or integration of each apparatus are not limited to the illustrated modes and all or a part thereof can be functionally or physically distributed and/or integrated in arbitrary units in accordance with various loads, usage, or the like. Furthermore, all of or a part of each processing function that is carried out by each apparatus may be realized by a CPU and a program that is analyzed and executed by the CPU or may be realized as hardware based on wired logic.

In addition, among processing steps described in the present embodiment, all of or a part of processing steps described as being automatically performed may be performed manually, or all of or a part of processing steps described as being manually performed may be performed automatically using known methods. Furthermore, information including processing procedures, control procedures, specific names, and various types of data and parameters set forth in the description and drawings given above can be arbitrarily changed unless otherwise specified.

Figure 28:
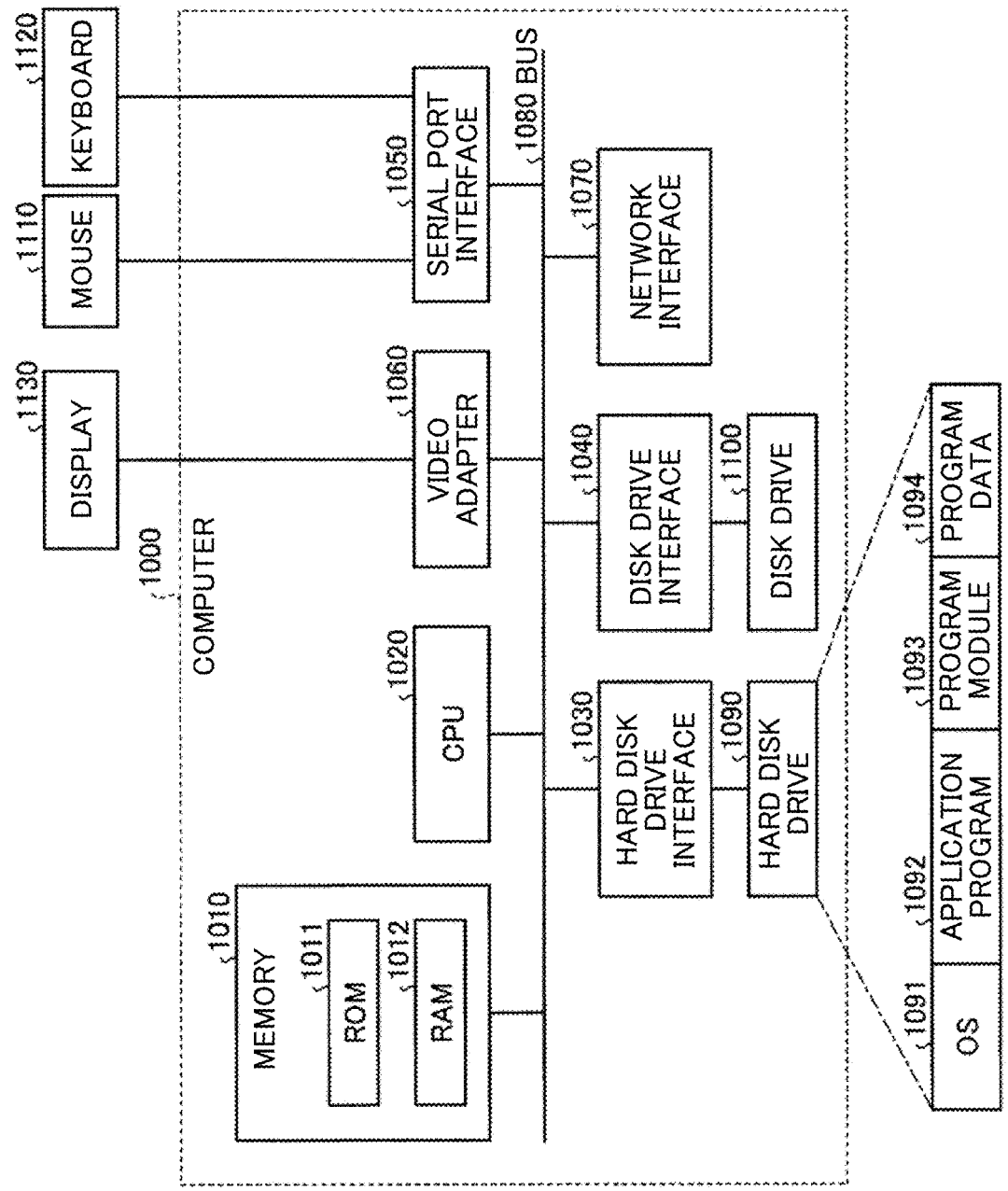
FIG. 28 is a diagram showing an example of a computer in which an information management apparatus is realized by executing a program.
Figure 29:
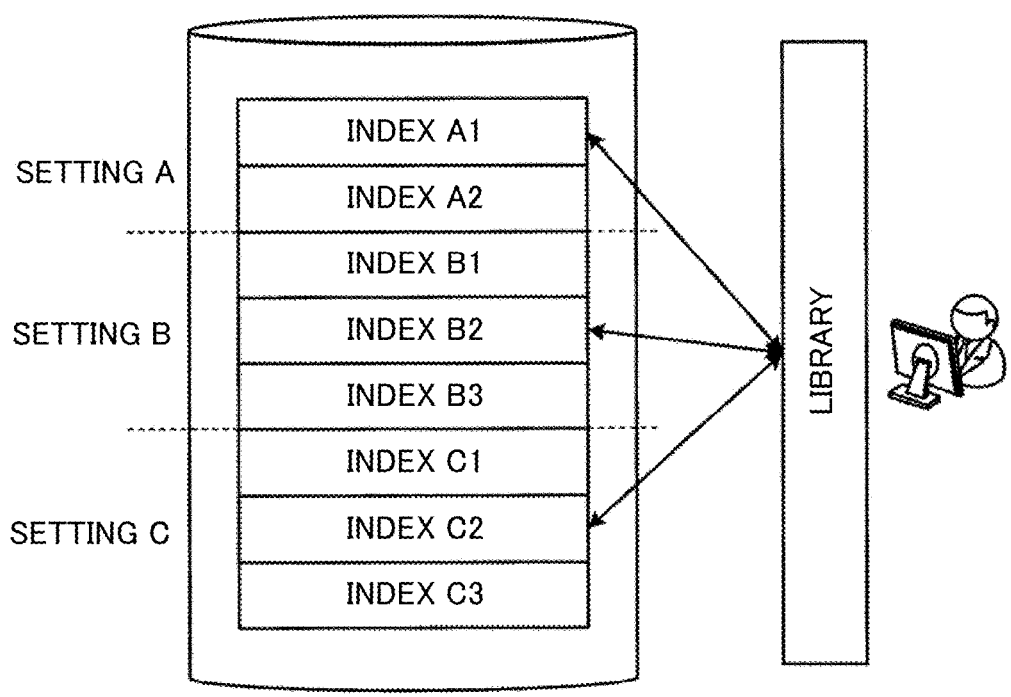
FIG. 29 is a diagram illustrating related art.
Figure 30:
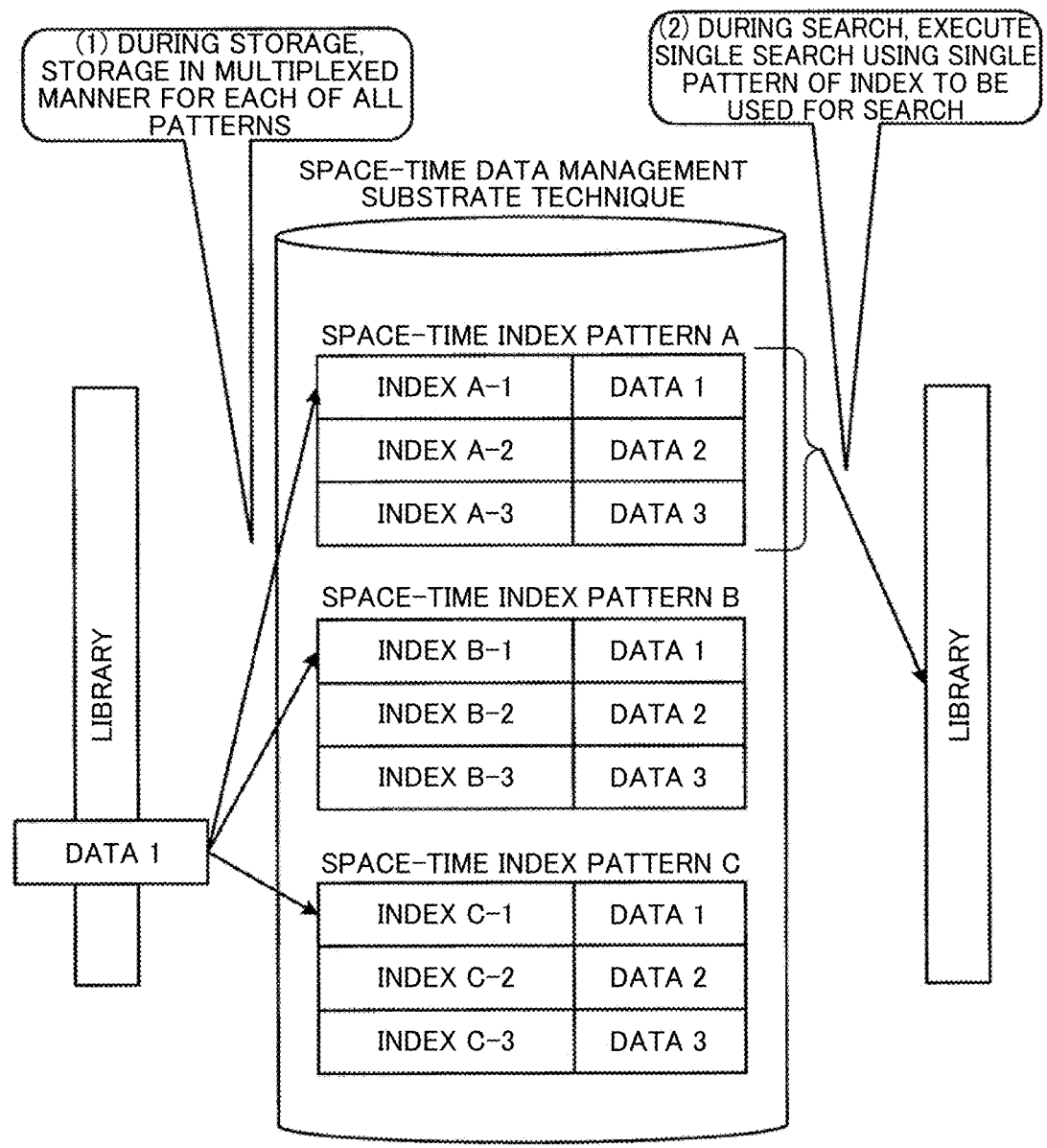
FIG. 30 is a diagram illustrating related art.

[Program] FIG. 28 is a diagram showing an example of a computer in which the information management apparatus 20 or 220 is realized by executing a program. For example, a computer 1000 has a memory 1010 and a CPU 1020. In addition, the computer 1000 has a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM 1012. For example, the ROM 1011 stores a boot program such as a BIOS (Basic Input Output System). The hard disk drive interface 1030 is connected to a hard disk drive 1090. The disk drive interface 1040 is connected to a disk drive 1100. For example, an attachable/detachable storage medium such as a magnetic disk or an optical disk is inserted into the disk drive 1100. For example, the serial port interface 1050 is connected to a mouse 1110 and a keyboard 1120. For example, the video adapter 1060 is connected to a display 1130.

For example, the hard disk drive 1090 stores an OS (Operating System) 1091, an application program 1092, a program module 1093, and program data 1094. In other words, a program that defines various processing steps of the information management apparatus 20 or 220 is implemented as the program module 1093 on which computer-executable codes are described. For example, the program module 1093 is stored in the hard disk drive 1090. For example, the program module 1093 for executing similar processing steps to the functional configuration of the information management apparatus 20 or 220 is stored in the hard disk drive 1090. It should be noted that the hard disk drive 1090 may be replaced with an SSD (Solid State Drive).

In addition, setting data to be used in processing of the embodiments described above is stored as the program data 1094 in, for example, the memory 1010 or the hard disk drive 1090. Furthermore, when necessary, the CPU 1020 loads the program module 1093 and the program data 1094 stored in the memory 1010 or the hard disk drive 1090 to the RAM 1012 and executes the program module 1093 and the program data 1094.

The program module 1093 and the program data 1094 are not limited to being stored in the hard disk drive 1090 and, for example, the program module 1093 and the program data 1094 may be stored in an attachable/detachable storage medium and read by the CPU 1020 via the disk drive 1100 or the like. Alternatively, the program module 1093 and the program data 1094 may be stored in another computer that is connected via a network (a LAN, a WAN (Wide Area Network), or the like). In addition, the program module 1093 and the program data 1094 may be read from the other computer by the CPU 1020 via the network interface 1070.

While embodiments representing an application of the invention made by the present inventor have been described above, it is to be understood that the present invention is not limited by the descriptions and the drawings which constitute a part of the present invention as disclosed by the present embodiments. In other words, it is to be understood that the present invention includes all other embodiments, practical examples, operation techniques, and the like which will occur to those skilled in the art based on the present embodiments.

REFERENCE SIGNS LIST

1 Information management system
10 Data transmission device
20, 220 Information management apparatus
21 Communicating unit
22 Storage unit
23, 223 Control unit
24, 224 Storing unit
25, 225 Searching unit
30 Space-time database (DB)
40 Terminal apparatus
41 Application
221 Composite index pattern data
241 Storage accepting unit
242 First converting unit
243 First dividing unit
246 Key setting unit
247 Value setting unit
248 Storage instructing unit
251 Search accepting unit
252 Second converting unit
253 Second dividing unit
254 Second pattern determining unit
255 Second pattern converting unit
256 Key searching unit
257 Rearward bit string searching unit
258 Value returning unit
2244 First pattern determining unit
2245 First composite index converting unit
2255 Second composite index converting unit

The invention claimed is:

1. An information management method executed by an information management apparatus that manages a space-time database which uses, as a key, a forward bit string of a bit string converted from space-time data including time data and positional data and which stores, as a value, corresponding data that corresponds to the space-time data, the information management method comprising:
   converting a range criterion of space-time data being a search object into a bit string;
   converting, when an index pattern of a first index that corresponds to a forward bit string of a bit string converted and an index pattern of a second index that corresponds to the key stored in the space-time database differ from each other, the first index into a third index of a same index pattern as the index pattern of the second index; and
   searching for the key using the third index and outputting, as a search result, corresponding data included in a value of the searched key.

2. The information management method according to claim 1, further including performing a search for the key as many times as a number of combinations of 0 or 1 to be arranged in a blank position among the third index.

3. The information management method according to claim 1, further including performing a search for the key using a predetermined number of bits at a top of the third index and extracting a key with a same bit arrangement as the third index among searched keys.

4. A non-transitory computer-readable recording medium storing therein an information management program that causes a computer to execute a process comprising:
- converting a range criterion of space-time data being a search object into a bit string with respect to a space-time database which uses, as a key, a forward bit string of a bit string converted from space-time data including time data and positional data and which stores, as a value, corresponding data that corresponds to the space-time data;
- converting, when an index pattern of a first index that corresponds to a forward bit string of a bit string converted and an index pattern of a second index that corresponds to the key stored in the space-time database differ from each other, the first index into a third index of a same index pattern as the index pattern of the second index; and
- searching for the key using the third index and outputting, as a search result, corresponding data included in a value of the searched key.

5. An information management apparatus that manages a space-time database which uses, as a key, a forward bit string of a bit string converted from space-time data including time data and positional data and which stores, as a value, corresponding data that corresponds to the space-time data, the information management apparatus comprising:
processing circuitry configured to:
- convert a range criterion of space-time data being a search object into a bit string;
- convert, when an index pattern of a first index that corresponds to a forward bit string of a bit string converted and an index pattern of a second index that corresponds to the key stored in the space-time database differ from each other, the first index into a third index of a same index pattern as the index pattern of the second index; and
- search for the key using the third index and output, as a search result, corresponding data included in a value of the searched key.

* * * * *